US012767175B1

(12) United States Patent
Mukundan et al.

(10) Patent No.: US 12,767,175 B1
(45) Date of Patent: Oct. 20, 2026

(54) DRIVING SIMULATION AGENT RIGHT-OF-WAY AND HEADLOCK NEGOTIATION

(71) Applicant: Zoox, Inc., Foster City, CA (US)

(72) Inventors: Priam Mukundan, Milpitas, CA (US); Nathaniel Nyberg, Seattle, WA (US); Maxwell Chandler Robinson, Burlingame, CA (US); Tod Cameron Semple, Woodside, CA (US)

(73) Assignee: Zoox, Inc., Foster City, CA (US)

( * ) Notice: Subject to any disclaimer, the term of this patent is extended or adjusted under 35 U.S.C. 154(b) by 6 days.

(21) Appl. No.: 18/963,344

(22) Filed: Nov. 27, 2024

(51) Int. Cl.
*B60W 60/00* (2020.01)
*B60W 50/00* (2006.01)

(52) U.S. Cl.
CPC .... *B60W 60/0015* (2020.02); *B60W 50/0097* (2013.01); *B60W 2520/10* (2013.01); *B60W 2552/30* (2020.02); *B60W 2555/60* (2020.02); *B60W 2556/40* (2020.02)

(58) Field of Classification Search
CPC ......... B60W 60/0015; B60W 50/0097; B60W 2520/10; B60W 2552/30; B60W 2555/60; B60W 2556/40
See application file for complete search history.

(56) References Cited

U.S. PATENT DOCUMENTS

| | | | | |
|---|---|---|---|---|
| 11,373,521 B2* | 6/2022 | Morris | G05D 1/0088 | |
| 12,183,195 B2* | 12/2024 | Crane | B60W 30/18159 | |
| 2021/0240190 A1* | 8/2021 | Wray | B60W 60/0011 | |
| 2022/0076670 A1* | 3/2022 | Marti | G01S 15/931 | |
| 2022/0340137 A1* | 10/2022 | Ollis | B60W 30/09 | |
| 2023/0037767 A1* | 2/2023 | Yang | G08G 1/167 | |
| 2023/0143805 A1* | 5/2023 | Baba | B60W 30/143 | 701/301 |
| 2023/0202529 A1* | 6/2023 | Cui | B60W 60/00276 | 701/26 |
| 2023/0322208 A1* | 10/2023 | Rojas | B60W 50/085 | 701/41 |
| 2024/0208546 A1* | 6/2024 | Pronovost | B60W 60/0027 | |
| 2024/0217557 A1* | 7/2024 | Yang | G08G 1/167 | |
| 2024/0246569 A1* | 7/2024 | Shikari | B60W 60/0015 | |
| 2025/0050912 A1* | 2/2025 | Baker | B60W 50/0097 | |

* cited by examiner

*Primary Examiner* — Donald J Wallace
*Assistant Examiner* — Jalal C Coduroglu
(74) *Attorney, Agent, or Firm* — Lee & Hayes, P.C.

(57) ABSTRACT

Techniques are described herein for encoding driving scenarios based on the characterizations of interactions between pairs or groups of agents within the driving scenarios. Additional techniques are described herein for executing driving simulations and using machine-learned (ML) classifier models to triage collisions and other interactions within the driving simulations. Further techniques are described for controlling agents and/or managing agent interactions within such driving simulations in a more realistic manner, including determining agent right-of-way and/or resolving headlock negotiations between programmatic agents in the simulations.

20 Claims, 16 Drawing Sheets

| Agent | Right-Of-Way State/Substate |
|---|---|
| 1304 | Driving straight w/o stopline. |
| 1306 | Crossing junction with protection. |
| 1308 | Crossing junction w/o priority. |
| 1310 | Crossing junction w/o protection. |
| 1312 | Driving straight w/o stopline. |
| 1314 | Unprotected right turn. |

DRIVING SIMULATION AGENT RIGHT-OF-WAY AND HEADLOCK NEGOTIATION

BACKGROUND

An autonomous vehicle may include various software-based systems, hardware-based systems, and/or controllers to guide the vehicle through an environment. For example, a controller of an autonomous vehicle can use sensor systems, object perception and prediction systems, and route planning and optimization techniques to determine driving paths and to guide the vehicle through environments containing static and dynamic objects. To ensure the safety of the occupants of the vehicle and the objects in the environment, it is important to test and verify the proper operation and safety of the autonomous vehicle systems. Simulated data and driving simulations can be used to test and verify the functionality of autonomous vehicle systems, some of which would be otherwise prohibitive to test in the real world (e.g., due to safety concerns, limitations on time, repeatability, etc.). For example, running simulations of scenarios may provide a valuable method for testing autonomous systems and/or machine-learned model pipelines, such as those incorporated in autonomous vehicles. However, effectively testing an autonomous vehicle component may require thousands or millions of simulations, which may take an enormous amount of computing bandwidth and time. This allocation of computing resources may increase the amount of time it takes to verify an update to a component, which may potentially prevent other components from being sufficiently tested and/or affect the performance or safety of the autonomous vehicle.

BRIEF DESCRIPTION OF THE DRAWINGS

The detailed description is described with reference to the accompanying figures. In the figures, the leftmost digit(s) of a reference number identifies the figure in which the reference number first appears. The use of the same reference numbers in different figures indicates similar or identical components or features.

DETAILED DESCRIPTION

Figure 1:
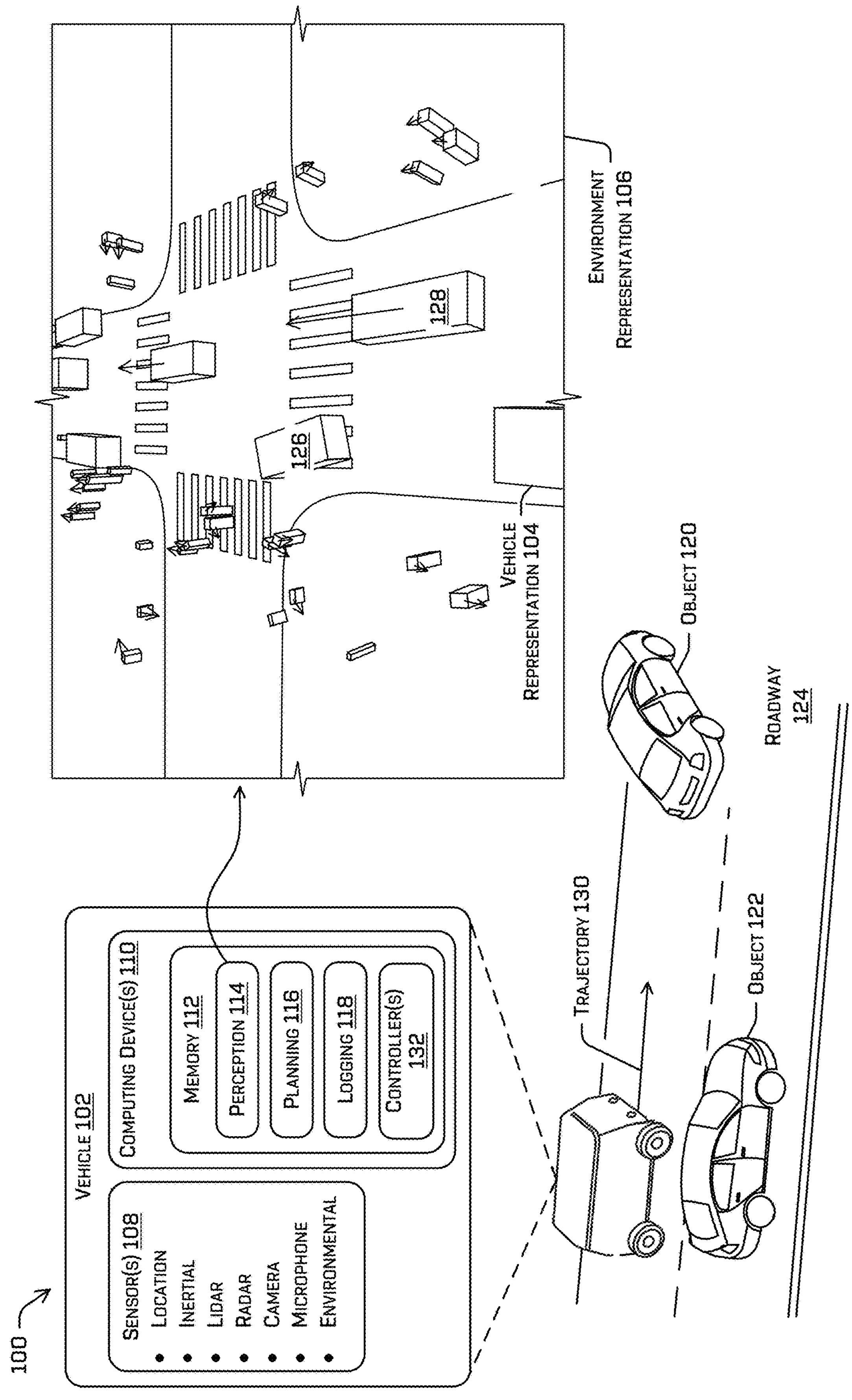
FIG. 1 illustrates an example driving scenario including an autonomous vehicle operating in a real-world driving environment, that may be modeled in a simulated scenario to validate the safety and/or efficacy of component(s) of the autonomous vehicle.

Various techniques described herein relate to encoding driving scenarios based on the characterizations of interactions between pairs or groups of agents in the driving scenarios. In some examples, the trajectories of various agents in a driving scenario are analyzed to detect potential interactions between pairs of agents having overlapping trajectories. Data characterizing the potential agent interactions may be determined, including the individual agent data, relative state data between the interacting agents, and the effects that one agent may have on the behaviors of another agent. A scenario encoding may be generated based on the various agent interactions in a driving scenario, to represent the driving scenario as a whole and/or particular fragments of the driving scenario. These scenario encodings (or embeddings) may comprise lower-dimensionality and interpretable representations of driving scenarios, while still effectively encoding the meaning and purpose of agent configurations/interactions within the driving scenario. In various examples, scenario encodings that represent some or all of a driving scenario may be used in a number of downstream tasks, including scenario classification, scenario search and retrieval, and/or synthetic scenario generation.

In the examples herein, driving scenarios may refer to real-world driving scenarios and/or simulated driving scenarios. In a real-world driving scenario, a vehicle (autonomous or otherwise) may include sensors and various other components (e.g., a perception component, planning component, map data component, localization component, etc.) configured to capture log data at various intervals while the vehicle is operating in a real-world driving environment. Portions (or snippets) of the log data collected by the vehicle (e.g., corresponding to a particular driving time window during the log data) may be stored as driving scenarios. In other examples, driving scenarios may include simulated scenarios performed by a simulation system, rather than a real-world vehicle. When performing a driving simulation, the simulation system may execute a driving scenario, which may be a log-based driving scenario (e.g., based on real-world log data collected by a vehicle) or a synthetic driving scenario. During the driving simulation, the simulation system may use one or more vehicle controllers to control a particular simulated vehicle in the simulation (which may be referred to as the ego vehicle). The simulation system may validate the performance of vehicle controllers, based on the behaviors of the simulated vehicle and/or based on the overall results of the simulation.

With respect to performing and validating driving simulations, additional techniques herein may relate to a simulation system using a machine-learned (ML) classifier model to triage driving simulations that include collisions. As described in more detail below, many collisions that occur in log-based driving simulations may be the result of a playback agents failing to respond to changes in the behavior of the simulated (or ego) vehicle caused by the vehicle controllers used to control the simulated vehicle. These collisions may reflect a limitation of the log-based simulation and/or the simulation system itself, rather than any undesirable behavior of the vehicle controllers being validated, and thus may be referred to as false positive collisions. However, certain collisions observed in log-based simulation runs may be true positive collisions that are caused by the behavior of the vehicle controllers being validated. It may be important for the simulation system to distinguish, triage, and analyze true positive collisions, in order to fully and effectively evaluate the performance of the vehicle controllers used in the simulation.

In various examples, the ML classifier model may be implemented using a pretrained foundation model for encoding driving scenarios, along with a separate classifier head (e.g., a multilayer perceptron (MLP)) trained to predict types and/or causes of collisions in driving simulations. In some cases, true positive collisions may be scarce/low-frequency relative to false positive collisions. In such cases, the simulation system May initially execute a similarity detector to determine whether a driving simulation including a collision is similar to a valid true positive collision. The similarity detector may be implemented using a scenario encoder, and may evaluate if the encoding of the driving scenario is within a distance threshold of an encoding of a true positive collision in the encoding vector space. If so, the similarity detector determines that the driving scenario is in-distribution relative to the training data for the ML classifier model, and thus the ML classifier model may be used to effectively predict the type and/or cause of the collision within the driving scenario.

Further techniques described herein may relate to controlling smart agents and managing smart agent interactions in a more realistic manner during driving simulations. Simulation systems may use one or more agent controllers to control the movements/driving behaviors of smart agents during driving simulations. In various examples, an agent controller may determine a potential interaction with another smart agent, playback agent, or simulated vehicle, based on detecting an overlap of the trajectories of the objects at a future time point in the simulation. In response to detecting the potential interaction, the smart agent controller may determine the right-of-way states and/or sub-states for the smart agent and the additional object interacting with the smart agent. Right-of-way states can be determined, for example, based on the agent's intended route relative to the road configuration of the driving environment. In some instances, the right-of-way states of two interacting agents can be compared to determine which agent should proceed and which agent should yield to avoid a potential collision between agents. Additionally, or alternatively, techniques are described herein for resolving headlock negotiations involving smart agents. In some examples, headlock negotiation techniques may be used to determine smart agent behavior when a potential interaction between agents cannot be resolved with the rules of the road or right-of-way. In such examples, the simulation system may apply heuristic-based headlock negotiation rules based on the agents' trajectories, and/or an ML headlock negotiation model trained based on real-world headlock negotiation scenarios, to determine which agents should assert priority and which agents should yield in headlock negotiations.

Additional techniques described herein relate to analyzing the overlapping trajectories of simulated agents to determine the intent of each simulated agent with respect to the interaction. For example, in a driving simulation including a simulated vehicle and any number of additional agents (e.g., smart agents and/or playback agents), the simulation system may initially detect a potential interaction between two agents (and/or one agent and the simulated vehicle) based on the agents having overlapping trajectories. The paths and characteristics of the overlapping trajectories can be analyzed using a rule set to determine whether a smart agent is crossing paths, following, leading, or merging with respect to the other agent. Based on the determination, the simulation system may use different driving parameters to control the smart agents in a more realistic manner. For instance, a smart agent following another agent (vehicle) may maintain a particular speed and/or headway distance with respect to the leading agent, while a smart agent crossing paths with another agent may use different speed and/or headway distance parameters. Additionally, as described below in more detail, determinations that a playback agent is following the simulated vehicle and/or a smart agent may be used to determine when during the driving simulation the playback agent should be converted to a smart agent.

As noted above, various techniques described herein may be performed by a simulation system configured to generate, execute, and analyze driving simulations. In such examples, the simulation system may be configured to validate autonomous vehicle components by performing log-based simulations. In a log-based driving simulation, log data may be provided as input to a simulated vehicle operating in a simulated driving environment, and the autonomous vehicle components may be used to control the simulated vehicle during the simulation. Log-based driving simulations may be performed in groups, referred to as simulation batches, in which various log data snippets representing driving scenarios from a log data repository may be sampled and provided as input to the simulation system. Simulations may be based on log data developed from real-world driving events, to accurately model scenarios that may occur during real-world driving.

Within a log-based driving simulation, the simulated driving environment may include playback agents configured to operate based on the log data associated with the corresponding agents in the real (e.g., non-simulated or physical) environment. For example, a real (e.g., non-simulated) vehicle traversing an environment may store log data collected by sensors and/or perception systems of the vehicle, including log data representing the agents and other objects observed by the vehicle, such as other vehicles, bicycles, pedestrians, etc. The simulation system may generate and execute a log-based simulation based on the log data, in which playback agents are generated and provided in the simulation to correspond to the agents observed in the real environment. Each playback agent may be based on a corresponding agent represented in the log data, and may operate in the simulation in a similar or identical manner to the corresponding agent observed in the real environment.

In some examples, during execution of a log-based simulation, the simulation system may convert one or more of the playback agents to "smart agents" that may be controlled by an agent controller instead of (or in addition to) the log data. Unlike playback agents, a smart agent in a driving simulation may react to the simulated environment and make operating decisions or behaviors that deviate from the behaviors of a corresponding playback agent in the log data. For instance, a smart agent may detect a potential interaction (e.g., a potential future collision) with another agent in the simulation, and may change its speed or trajectory to avoid the interaction. In contrast, a playback agent may be limited to actions of the agent recorded in the log data and may possess no independent decision-making capabilities.

In some examples, the simulation system may monitor the execution of log-based simulations to detect potential interactions between playback agents and other agents in the simulation. In response to detecting an interaction involving a playback agent, the simulation system may convert the playback agent to a smart agent, thereby allowing an agent controller to control the driving path/behaviors of the smart agent during the simulation to prevent the interaction. After a playback agent has been converted to a smart agent, it may deviate from the behavior of its corresponding playback agent in the log data. In some cases, as a driving simulation continues, the deviations of a smart agent may result in the smart agent interacting with additional playback agents, thereby causing the simulation system to convert the additional playback agents into smart agents in response to these interactions. The result may be a cascading effect of converting playback agents to smart agents as a driving simulation continues.

As illustrated by these and other examples, the various techniques described herein provide a number of improvements and technical advantages for generating, executing, and validating driving simulations. For example, encoding driving scenarios based on agent interaction data may provide driving scenario representations that are lower dimensionality relative to the scenario log data but still interpretable (e.g., in contrast to certain machine-learned scenario embeddings). Additionally, scenario encodings based on the agent interactions in the driving scenarios may be uniquely effective at capturing the meaning, intent, and/or context of the complex agent interactions within the scenario. Further, when encoding a scenario based on agent interaction data, the encoding scheme provides flexibility to encode the entire driving scenario or any subset of the agent interactions (e.g., encoding a single agent-agent interaction over time, encoding a scenario fragment including a subset of interacting agents, etc.). These techniques for encoding driving scenarios based on agent interactions thus may provide advantages when performing the various downstream tasks described herein, such as scenario classification, scenario search and retrieval, and/or synthetic scenario generation. For example, these techniques may provide advantages of generating and/or validating simulated driving scenarios having specific types of agent configurations and/or interactions to achieve robust and effective simulation test coverage.

The techniques described herein also may provide improvements in driving simulation systems by controlling smart agents in simulations in a more realistic manner when detecting and responding to agent interactions. For example, the techniques described herein enable a simulation system to control simulated smart agents to detect and respond to potential interactions in a realistic way by evaluating right-of-way states, performing headlock negotiation analysis, and distinguishing a following behavior from other types of interactions (e.g., crossing paths, merging, etc.). As a result, driving simulations performed using these techniques may improve the realistic quality of driving simulations to provide more effective and valuable validations of the vehicle controllers during challenging driving situations.

Further, these techniques may provide additional advantages of allowing the simulation system to execute and evaluate log-based simulations that are more robust and durable with respect to changes in the vehicle controllers being tested, as well as simulations that more accurately represent real-world driving scenarios. For example, in some existing simulation systems, when a log-based simulation results in a collision between the simulated vehicle and a playback agent, the simulation may be invalidated and/or discarded from a simulation test battery. However, as described herein, distinguishing false positive collisions from true positives in log-based simulations may be critical to evaluating the performance of the vehicle controllers used during the simulation. Further, the log-based simulations in some systems may be short-lived and can become outdated quickly, since any change to the vehicle controllers of the simulated vehicle may cause the simulation to be invalidated. In contrast, the techniques described herein include improved smart agent behaviors and improved triage of collisions in log-based simulations, thus providing more accurate simulation testing and more robust and enduring simulations that may operate over longer periods of time with fewer failures, and less need for intervention and manual analysis, thereby increasing the number of usable simulation test and improving the efficiency and quality of simulation systems.

FIG. 1 illustrates an example scenario 100 including a vehicle 102. In some examples, the example scenario 100 may be a real-world scenario and/or the example scenario 100 may be a representation of a real-world scenario modeled as a simulated scenario. In examples where the example scenario 100 is a simulated scenario, the example scenario 100 may be determined based at least in part on a set of scenario parameters identifying characteristic(s) of the simulation, which may be based at least in part on log data received from one or more autonomous vehicles. The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device (not illustrated in FIG. 1).

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle, such as the vehicle representation 104 in simulation representation 106. For simplicity, the discussion herein does not distinguish between a simulated vehicle and a real-world vehicle. References to a "vehicle" may therefore reference a simulated and/or a real-world vehicle.

According to the techniques discussed herein and an example where scenario 100 is a real-world example, the vehicle 102 may receive sensor data from sensor(s) 108 of the vehicle 102. For example, the sensor(s) 108 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 108 on the vehicle 102 and in a simulation, one or more of sensor(s) 108 may be simulated. In some examples, the position of a simulated sensor may correspond with a relative position of one of the sensor(s) 108 to the vehicle 102 and/or vehicle representation 104.

The sensor(s) 108 may generate sensor data, which may be received by computing device(s) 110 associated with the vehicle 102. However, in other examples, some or all of the sensor(s) 108 and/or computing device(s) 110 may be separate from and/or disposed remotely from the vehicle 102 and data capture, processing, commands, and/or controls may be communicated to/from the vehicle 102 by one or more remote computing devices via wired and/or wireless networks. During a simulation, the sensor data may be simulated based at least in part on a synthetic environment generated by the simulation system.

Computing device(s) 110 may comprise a memory 112 storing a perception component 114, a planning component 116, and/or a logging component 118. Note that, in some examples, the computing device(s) 110 may additionally or alternatively store a prediction component, map data, and/or localization component. The prediction component may be part of the perception component 114 and it may determine a predicted position, orientation, velocity, acceleration, and/or state (e.g., aperture state, blinker state) associated with an object. The localization component may comprise software and/or hardware system(s) for determining a pose (e.g., position and/or orientation) of the vehicle 102 relative to one or more coordinate frames (e.g., relative to the environment, relative to a roadway, relative to an inertial direction of movement associated with the autonomous vehicle). The localization component may output at least part of this data to the perception component 114, which may output at least some of the localization data and/or use the localization data as a reference for determining at least some of the perception data.

In general, the perception component 114 may determine what is in the environment surrounding the vehicle 102 (or during a simulation, what is in the simulated environment) and the planning component 116 may determine how to operate the vehicle 102 (or control the vehicle representation 104 in a simulation) according to information received from the localization component and/or the perception component 114. The prediction component, the localization component, the perception component 114, and/or the planning component 116 may include one or more machine-learned (ML) models and/or other computer-executable instructions.

In some examples, the localization component and/or the perception component 114 may receive sensor data from the sensor(s) 108 and/or simulated data from a simulation system. In some examples, the localization component and/or perception component 114 may comprise a pipeline of hardware and/or software, which may include one or more GPU(s), ML model(s), Kalman filter(s), and/or the like. In some instances, the perception component 114 may determine data related to objects (or simulated objects) in the vicinity of the vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), map data that identifies characteristics detected in proximity to the vehicle (e.g., locations and/or dimensions of the roadway, roadway classification(s) (e.g., directionality associated with a portion of the roadway, crosswalk locations, controlled intersection type, signage type and location), buildings, trees, fences, fire hydrants, and any other feature detectable in various sensor modalities), etc. In some examples, the objects surrounding the vehicle 102 may be simulated objects of a simulated environment. The data produced by the perception component 114 may be collectively referred to as "perception data." Once the perception component 114 has generated perception data, the perception component 114 may provide the perception data to the planning component 116.

In some examples, simulations to validate a particular component of an autonomous vehicle may provide simulation data directly to that component. For example, to test the planning component 116, instead of providing simulated sensor data to the perception component 114, simulated perception data may be provided to the planning component 116 directly. This simulated perception data may be ground truth data, in at least one example. Additionally or alternatively, the vehicle system(s) may be tested as a whole by providing simulated sensor data to the localization component and/or perception component (e.g., to the system(s) that would be root nodes/furthest upstream during normative operation rather than providing simulated data to an intermediate component in the vehicle system).

During a real-world scenario, perception component 114 may detect object 120, a vehicle in the depicted example; object 122, another vehicle in the example; and/or characteristics of the roadway 124. During a simulation, perception component 114 may detect representation 126 and/or representation 128, where representation 126 may represent object 120 and representation 128 may represent object 122 in a simulation that reproduces the real-world scenario illustrated. Note that the depicted simulation representation 106 is a simplified simulation where different objects are represented as boxes and the depicted simulation representation 106 additionally includes additional simulated objects representing additional vehicles and pedestrians. It is understood that, instead of or in addition to a simplified simulation, the simulation may replicate real-world appearances.

When a perception component 114 detects an object, whether real or simulated, the perception component 114 may generate an object detection, which may comprise a data structure indicating one or more characteristics of the object. For example, the object detection may indicate a region of interest (ROI) associated with the object detection (e.g., a bounding box, mask, or other indication of a portion of sensor data associated with the object); instance segmentation; semantic segmentation; a volume or area occupied by the object; a pose (e.g., position and/or orientation); velocity; acceleration; classification (e.g., vehicle, pedestrian, articulating vehicle, signage); track; confidence score(s) that any such data is accurate; etc. associated with the object. The perception component 114 may associate an object detection with a track, which may indicate that the object has been previously detected and may comprise historical perception data and/or predicted perception data associated with the object. For example, the track may associate one or more object detections associated with the same object but different times. In some examples, the track may indicate a current, historical, and/or predicted position, orientation, velocity, acceleration, and/or state associated with an object.

In some examples, the perception component 114 may comprise a prediction component that determines predicted data associated with an object, such as a predicted future position, orientation, velocity, acceleration, state, or the like. This predicted data and/or historical data associated with an object may be amalgamated with the current object detection data as a track in association with the object. In some examples, the prediction data may be additionally or alternatively based at least in part on map data or other data. In some examples, the prediction data may comprise a top-down segmentation of the environment, as described in more detail in U.S. Pat. No. 10,649,459, filed Apr. 26, 2018, which is incorporated by reference in its entirety for all purposes herein, and/or a top-down prediction associated with the environment, as described in more detail in U.S. Patent Application Publication No. 2021/0181758, filed Jan. 31, 2020, which is incorporated by reference in its entirety for all purposes herein. In some examples, the prediction data generated by such a prediction component may be part of the perception data.

The planning component 116 may determine a trajectory 130 based at least in part on the perception data and/or localization data (e.g., where the vehicle 102 is in the environment relative to a map and/or features detected by the perception component 114). For example, the planning component 116 may determine a route for the vehicle 102 from a first location to a second location; generate, substantially simultaneously and based at least in part on the perception data, a plurality of potential trajectories for controlling motion of the vehicle 102 in accordance with a receding horizon technique (e.g., 1 micro-second, half a second, 4 seconds, 8 seconds, and the like) to control the vehicle to traverse the route (e.g., in order to avoid any of the detected objects); and select one of the potential trajectories as a trajectory 130 that the vehicle 102 may use to generate a drive control signal that may be transmitted to drive components of the vehicle 102 or, in a simulation, to control the vehicle representation 104 in the simulated environment.

FIG. 1 depicts an example of such a trajectory 130, represented as an arrow indicating a position, heading, velocity, and/or acceleration, although the trajectory itself may comprise instructions for a controller, which may, in turn, actuate a drive system of the vehicle 102. For example, the trajectory 130 may comprise instructions for controller(s) 132 of the autonomous vehicle 102 to actuate drive components of the vehicle 102 to effectuate a steering angle and/or steering rate, which may result in a vehicle position, vehicle orientation, vehicle velocity, and/or vehicle acceleration (or a simulated version thereof when the autonomous vehicle is being simulated). The trajectory 130 may comprise a target heading, target steering angle, target steering rate, target position, target velocity, and/or target acceleration for the controller(s) to track over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters). However, in a simulation, the trajectory may be used by a simulation system to control a position, orientation, velocity, acceleration, etc. of the simulated autonomous vehicle.

In some examples, the logging component 118 may determine log data comprising sensor data, perception data, scenario data, and/or planning data to store and/or transmit to a remote computing device (not illustrated in FIG. 1), as well as any other message generated and or sent by the vehicle 102 during operation including, but not limited to, control messages, error messages, etc. In some examples, a real-world vehicle 102 may transmit the log data to a remote computing device(s). The remote computing device(s) may identify one or more scenarios based at least in part on the log data, which may also comprise defining a scenario. For example, the remote computing device(s) may determine an environmental layout, a number, classification, and/or a position of object(s) in the environment and/or associate this definition with one or more portions of log data associated with that scenario. The remote computing device(s) may determine a set of scenario parameter(s) to represent such characteristics of a scenario. Note that, although simulation scenarios may be determined from log data, they may also be defined based at least in part on user input, procedurally generated, or the like.

Figure 2:
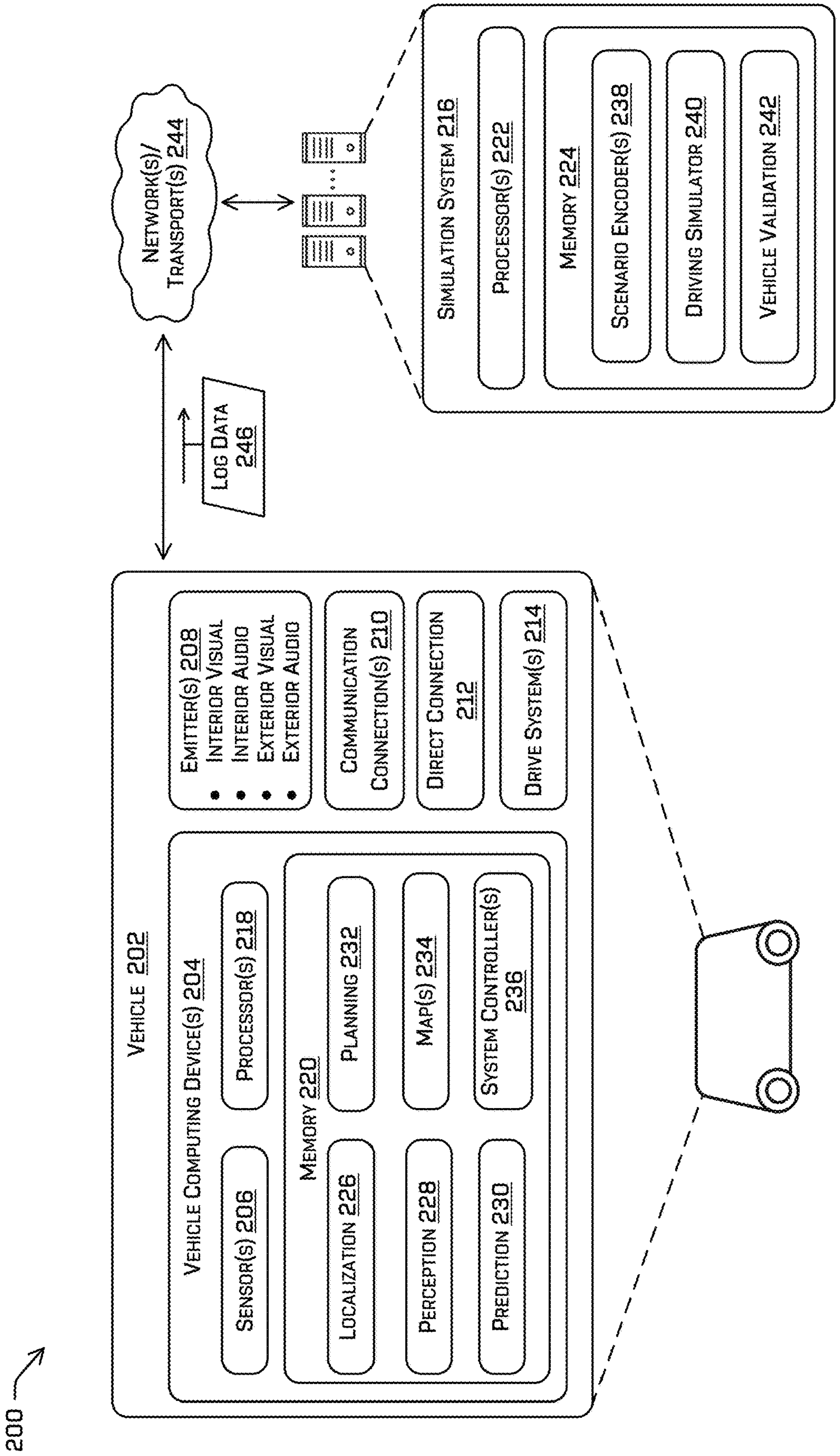
FIG. 2 is a block diagram illustrating an example architecture for encoding driving scenarios and performing driving simulations to validate component(s) of an autonomous vehicle, in accordance with one or more examples of the disclosure.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, one or more network interfaces 210, one or more direct connections 212, and/or drive system(s) 214. Vehicle computing device(s) 204 may represent computing device(s) 110 and sensor(s) 206 may represent sensor(s) 108. The system 200 may additionally or alternatively comprise the simulation system 216.

In some instances, the sensor(s) 206 may represent sensor(s) 108 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to the simulation system 216. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive system(s) 214. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with the simulation system 216. In some examples, simulation system 216 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s)/transport(s) 248. For example, the network interface(s) 210 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 2G, 3G, 4G, 4G LTE, 5G, etc.), or any suitable wired or wireless communications protocol that enables the respective computing device to interface with the other computing device(s). In some instances, the vehicle computing device(s) 204 and/or the sensor(s) 206 may send sensor data, via the network(s)/transport(s) 248, to the simulation system 216 and/or other remote computing device(s) at a particular frequency, after a lapse of a predetermined period of time, in near real-time, etc.

In some instances, the vehicle 202 may include one or more drive system(s) 214. In some instances, the vehicle 202 may have a single drive system 214. In some instances, the drive system(s) 214 may include one or more sensors to detect conditions of the drive system(s) 214 and/or the surroundings of the vehicle 202. By way of example and not limitation, the sensor(s) of the drive system(s) 214 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive system(s) 214. In some cases, the sensor(s) on the drive system(s) 214 may overlap or supplement corresponding systems of the vehicle 202 (e.g., sensor(s) 206).

The drive system(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 may include a drive system controller which may receive and preprocess data from the sensor(s) and to control operation of the various vehicle systems. In some instances, the drive system controller may include one or more processors and memory communicatively coupled with the one or more processors. The memory may store one or more components to perform various functionalities of the drive system(s) 214. Furthermore, the drive system(s) 214 may also include one or more communication connection(s) that enable communication by the respective drive system with one or more other local or remote computing device(s).

The vehicle computing device(s) 204 may include processor(s) 218 and memory 220 communicatively coupled with the one or more processors 218. Memory 220 may represent memory 112. Simulation system 216 and/or other computing device(s) may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media that may store processor-executable instructions. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, map data 234, and/or system controller(s) 236—zero or more portions of any of which may be hardware, such as GPU(s), CPU(s), and/or other processing units. Perception component 228 may represent perception component 114, planning component 232 may represent planning component 116, and/or system controller(s) 236 may represent controller(s) 132.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment, such as map data 234, and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some examples, the localization component 226 may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 202, and/or the like. In some instances, the localization component 226 may provide data to various components of the vehicle 202 to determine an initial position of an autonomous vehicle for generating a trajectory and/or for generating map data. In some examples, localization component 226 may provide, to the perception component 228 and/or planning component 232 a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, acceleration, and/or other state associated with an object), and/or the like. The perception component 228 may include a prediction component that predicts actions/states of dynamic components of the environment, such as moving objects, although the prediction component may be separate, as in the illustration. In some examples, the perception component 228 may determine a top-down representation of the environment that encodes the position(s), orientation(s), velocity(ies), acceleration(s), and/or other states of the objects and/or map data in the environment. For example, the top-down representation may be an image with additional data embedded therein, such as where various pixel channel values encode the perception data and/or map data discussed herein. Data determined by the perception component 228 is referred to as perception data.

The prediction component 230 may include functionality to generate predicted information associated with objects in an environment. As an example, the prediction component 230 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 202 traverses an environment. The future (predicted) state data may indicate a predicted object position, orientation, velocity, acceleration, and/or other state (e.g., door state, turning state, intent state such as signaling turn) of a detected object. Data determined by the prediction component is referred to as prediction data and may be part of the perception data. In some examples, the prediction component may determine a top-down representation of a predicted future state of the environment. For example, the top-down representation may be an image with additional data embedded therein, such as where various channel pixel values encode the prediction data discussed herein. In various examples, the prediction component 230 can generate one or more predicted positions, predicted velocities, predicted trajectories, etc., for such target objects based on attributes of the target object and/or other objects proximate the target object.

The planning component 232 may receive a location and/or orientation of the vehicle 202 from the localization component 226, perception data from the perception component 228, and/or prediction data from the prediction component 230, and may determine instructions for controlling operation of the vehicle 202 based at least in part on any of this data. In some examples, the memory 220 may further store map data 234 and this map data may be retrieved by the planning component 232 as part of generating environment state data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive system(s) 214)) that the drive system(s) 214 may perform/cause to be carried out, second instructions for the emitter(s) 208 may be formatted according to a second format associated therewith). In some examples, where the planning component 232 may comprise hardware/software-in-a-loop in a simulation (e.g., for testing and/or training the planning component 232), the planning component 232 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

In some examples, the vehicle 202 may transmit log data 250 to one or more remote computing devices, such as a simulation system 216. The log data 250 may comprise sensor data, perception data, planning data, and/or scenario data collected/determined by the vehicle 202 (e.g., by the perception component 228), as well as any other message generated and or sent by the vehicle 202 during operation including, but not limited to, control messages, error messages, etc.

In some examples, the map data 234 may comprise a two-dimensional or three-dimensional representation of the environment, characteristic(s) associated therewith, and/or embedding(s). A two-dimensional representation may include, for example, a top-down representation of the environment and a three-dimensional representation May comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 202; and/or the like. The occlusion data may further indicate occlusions to different classes of sensors, such as portion(s) of the environment occluded to visible light cameras but not to radar or lidar, for example. The two-dimensional representation and/or three-dimensional representation may have embeddings associated therewith that encode this data via the learned process discussed herein. For example, for a three-dimensional representation of the environment comprising a mesh, an embedding may be associated with a vertex of the mesh that encodes data associated with a face that may be generated based on one or more vertices associated with the face. For a two-dimensional representation of the environment an edge or other portion of the top-down representation may be associated with an embedding.

In some examples, memory 220 and/or memory 224 may store one or scenario encoder(s) 238, a driving simulator 244, and/or vehicle validation component(s) 246. As described herein, these components may collectively and/or individually be used to perform driving simulations to test and/or validate one or more components of the vehicle 202. For example, a previous, new, or updated software and/or hardware component of the vehicle 202 may be tested to ensure that component or any changes thereto maintain or increase the safety and/or efficacy of operations of the vehicle 202. In some examples, the driving simulation and vehicle validation processes discussed herein may ensure that a new or updated component will not degrade the safety and/or efficacy of operations of the vehicle 202 before updating the software and/or changing or adding hardware of the vehicle 202.

In some examples, the simulation system 216 may receive log data 250 from the vehicle 202 and/or one or more other vehicles. The log data 250 may comprise different sets of log data, each of which may comprise a log data generated by the vehicle 202 over a defined period of time. The discussion herein pertains to at least a first set of such log data, but may be extended to additional sets of log data, up to all of the log data sets. The simulation system 216 may store the log data in a log data repository, which may be accessed by the scenario encoder(s) 238, driving simulator 244, and/or vehicle validation component(s) 246. The log data repository may be stored as one or more data stored with the simulation system 216 or may be stored remotely from the simulation system 216 (e.g., within a cloud-based storage). In some examples, the simulation system 216 may encode, vectorize, and cluster the log data 250 into segments within the log data repository, and may determine scenario parameters for each segment. When storing the log data, the simulation system 216 may be configured divide sets of log data into segments (or snippets) each associated with a 10 second, 15 second, 30 second, or any other period of time. To give a practical example, if a first set of log data includes log data generated by the vehicle 202 over 2 minutes and the segments are each associated with 15 seconds of log data, the simulation system 216 may divide the first set of log data into 8 segments (or log data records) of 15 seconds each.

The scenario encoder(s) 238 may include any number of driving scenario (or driving scene) encoders configured to encode log data representing a driving scenario (or driving scene) into a lower-dimensional encoding. In some examples, the scenario encoder(s) 238 may including ML scenario encoders 240 (e.g., transformers, multilayer perceptrons (MLPs), and/or other neural networks) trained to encode driving scenarios into reduced-dimensionality scenario embeddings, as feature vectors in a scenario embedding vector space. Examples of ML scenario encoders 240 may include, but are not limited to the examples of scene encoders described in U.S. patent application Ser. No. 18/641,052, filed Apr. 19, 2024, and entitled, "Contrastive Trained Driving Scene Model With Multiple Encoders," U.S. patent application Ser. No. 17/855,088, filed Jun. 30, 2022, and entitled, "Machine-Learned Component For Vehicle Trajectory Generation," in U.S. patent application Ser. No. 18/526,999, filed Dec. 1, 2023, and entitled, "Multimodal Masked Driving Scene Encoder," in U.S. patent application Ser. No. 18/084,419, filed Dec. 19, 2022, and entitled, "Machine-Learned Cost Estimation In Tree Search Trajectory Generation For Vehicle Control," in U.S. patent application Ser. No. 18/392,114, filed Dec. 21, 2023, and entitled, "Machine-Learned Candidate Action Selection In Tree Search," or in U.S. patent application Ser. No. 18/820,816, filed Aug. 30, 2024, and entitled, "Estimating Driving Behavior Metrics Using Scenario Embeddings," the entire contents of each of which are incorporated herein by reference in their entirety for all purposes.

Additionally or alternatively, scenario encoder(s) 238 may include various non-ML based scenario encoders, for example, agent interaction encoder(s) 242. The agent interaction encoder(s) 242 may be configured to generate interpretable driving scenario encodings based on the characteristics of the agent interactions in a driving scenario. In some examples, the agent interaction encoder(s) 242 may detect interaction data associated with a pair of interacting vehicles and/or agents in a driving scenario, such as the relative distances, speeds, and yaws of the agents, and other interaction data that may be determined from the agent trajectories within the log data of the driving scenario. The agent interaction may be stored in encodings as a fully or partially interpretable data structures representing the driving scenario. The scenario encodings, which may include one or more agent interaction data structures, may be reduced in size/dimensionality relative to the full log data of the driving scenario, but also may effectively encoding the meaning and context of complex agent configurations/interactions within the driving scenario. As described below in more detail, various combinations of the scenario encoder(s) 238, including ML scenario encoders 240 and/or agent interaction encoder(s) 242 may be used by the simulation system 216 to perform various downstream tasks, including scenario classification, scenario search and retrieval, synthetic scenario generation, etc.

The driving simulator 244 may operate on the vehicle 202 and/or on the simulation system 216 (although FIG. 2 depicts the driving simulator 244 as operating on the simulation system 216). For instance, if the driving simulator 244 is operating on the vehicle 202, the driving simulator 244 may provide alternate prediction(s) about the maneuver and/or path that an object may take.

The driving simulator 244 may be configured to generate and execute driving simulations based at least in part on the set of log data 250 determined received from the vehicle 202. In some examples, during a driving simulation, the driving simulator 244 may be configured to provide portions of log data as input to one or more components of an autonomous vehicle. For example, the log data 250 may comprise sensor data, perception data, localization data, and/or planning data. Depending on the component being tested, such as whether the component is part of the localization component 226, the perception component 228, the prediction component 230, the planning component 232, the system controller(s) 236, or a hardware change to these or any of the other components, the driving simulator 244 may provide the sensor data, perception data, localization data, prediction data, and/or planning data as input to any one or more of these components.

Log data 250 representing a driving simulation may comprise a representation of a position, orientation, movement, and/or quality of portions of the environment and/or the vehicle 202. The driving environment may comprise other objects, such as other vehicles, pedestrians, buildings, signage, and the like. Simulations can be used to validate any combination of the software executed on the vehicle 202 and/or hardware and gather performance metrics (such as safety and/or efficacy metrics) to ensure that the software is able to safely control such vehicles in various scenarios. In additional or alternative examples, simulations can be used to learn about the constraints of autonomous vehicles that use the autonomous vehicle controller(s).

Driving simulations can be used to understand the operational space of an autonomous vehicle (e.g., an envelope in which the autonomous controller effectively controls the autonomous vehicle) in view of surface conditions, ambient noise, faulty components, etc. Simulations can also be useful for generating feedback for improving operations and designs of autonomous vehicles. In some examples, simulations can be useful for determining an amount of redundancy that is required in an autonomous controller, how to modify a behavior of the autonomous controller based on what is learned through simulations, or whether the autonomous controller is ready to be deployed.

In some examples, the driving simulator 244 may provide respective parts of the log data to respective components of the vehicle as part of the simulation (e.g., providing simulated sensor data to vehicle sensors, providing perception data to a vehicle perception component, etc.). Additionally or alternatively, the driving simulator 244 may use the set of scenario parameters to generate the simulation, which may be a two or three-dimensional representation of a driving scenario. For example, the three-dimensional representation may comprise position, orientation, geometric data (e.g., a polygon representation, a digital wire mesh representation) and/or movement data associated with one or more objects of the environment and/or may include material, lighting, and/or lighting data, although in other examples this data may be left out.

In some examples, a simulated sensor may determine simulated sensor data based at least in part on the simulation generated by the driving simulator 244. For example, U.S. patent application Ser. No. 16/581,632, filed Sep. 24, 2019 and incorporated by reference herein for all purposes, discusses this in more detail. In an additional or alternate example, the simulation may itself comprise simulated sensor data and/or simulated perception data.

In an example where the perception component 228, prediction component 230, and/or planning component 232 is/are being tested, the perception component 228 (e.g., a copy thereof, which may comprise software and/or hardware, which may include hardware-in-the-loop simulation) may receive the sensor data from the set of log data (or simulated sensor data) and may output perception data to the prediction component 230 and/or the planning component 232 (e.g., a copy thereof, which may comprise software and/or hardware, which may include hardware-in-the-loop simulation). Additionally or alternatively, prediction component 230 and/or planning component 232 may receive simulated perception data from the driving simulator 244 or perception data sampled from (or generated by) a log data repository of the simulation system 216. Additionally or alternatively, the localization component 226 (e.g., a copy thereof, which may comprise software and/or hardware, which may include hardware-in-the-loop simulation) may receive sensor data from the set of log data and may output localization data to the prediction component 230 and/or planning component 232.

During a simulation run by the driving simulator 244, a planning component 232 may generate a trajectory for controlling the vehicle 202, which may be used by the driving simulator 244 to control a simulated vehicle (or ego vehicle) based on vehicle 202, in addition to or instead of sending instructions to the drive system(s) 214 to implement the trajectory. In some examples, the trajectory may additionally or alternatively be provided to the system controller(s) 236 and hardware-in-the loop or an output of the system controller(s) 236 may be used to control a simulation of the vehicle 202. Accordingly, this trajectory and/or instructions determined by system controller(s) 236 may control a simulated position, orientation, velocity, acceleration, state, and/or turn rate of a simulated vehicle in a simulated environment generated by the driving simulator 244.

In some examples, the driving simulator 244 or the vehicle validation component 246 may additionally or alternatively determine one or more performance metrics based at least in part on the simulation or an outcome of the simulation. The results may include, for example, data indicating the minimum distance from the simulated vehicle to any other simulated object over the course of the simulation, velocities of the simulated vehicle over the course of the simulation, data representing various contacts or interactions with other objects, failures of the simulated vehicle to detect another simulated object, pauses, stops, alterations or ending of a mission or route, idling, failing to determine an operation to control the vehicle, or the like.

In some examples, the vehicle validation component 246 may store a ruleset and may determine whether the autonomous vehicle controller(s) being tested (e.g., a target component) passed or failed a scenario based at least in part on the ruleset. Additionally or alternatively, the rule set may define threshold performance metric(s) for indicating whether the target component is validated for use by the vehicle 202 or not. In some examples, the simulation system 216 may record a version of the target component in association with a scenario identifier and/or an indication of whether the target component passed or failed. In an additional or alternate example, the simulation system 216 may determine a non-binary indication associated with the performance of the target component (e.g., a score in addition to or instead of a pass/fail indication). The non-binary indication may be based at least in part on a set of weights associated with the ruleset. In some examples, the ruleset may be part of or replaced by an event detection system (U.S. patent application Ser. No. 16/682,971, filed Nov. 13, 2019, the entirety of which is incorporated by reference herein for all purposes) and/or a collision monitoring system (U.S. patent application Ser. No. 16/703,625, filed Dec. 4, 2019, the entirety of which is incorporated by reference herein for all purposes).

Any of the results, events, rulesets, etc. discussed above may be used to determine one or more performance metrics associated with a target component or overall performance of the vehicle 202. In some examples, the vehicle validation component 246 may additionally or alternatively determine confidence scores and/or confidence intervals associated with performance metrics. In at least one example, the performance metrics may be a number of collisions near-miss collisions, a number of serious collisions, a number of contacts or disengagements of autonomous driving functionality, and/or other any other anomalous or undesirable driving behavior. Such performance metrics may be determined for individual simulations and/or large simulation batteries in which the performance metrics may be computed per hundreds of driving hours, per thousands of driving miles, etc.

As described herein, the localization component 226, the perception component 228, the prediction component 230, the planning component 232, ML scenario encoders 240, driving simulator 244, and/or vehicle validation component 246, and/or other components of the system 200 may comprise one or more ML models. For example, localization component 226, the perception component 228, the prediction component 230, the planning component 232, ML scenario encoders 240, driving simulator 244, and/or vehicle validation component 246 each may comprise different ML model pipelines. In some examples, an ML model may comprise a neural network. An exemplary neural network is an algorithm that passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236 (which may be a portion of the drive component(s)), which may be configured to control steering, propulsion, braking, safety, emitters, communication, and other systems of the vehicle 202. These system controller(s) 236 may communicate with and/or control corresponding systems of the drive system(s) 214 and/or other components of the vehicle 202. For example, the planning component 232 may generate instructions based at least in part on perception data and/or prediction data generated by the perception component 228 and the prediction component 230, and/or simulated perception and prediction data, and transmit the instructions to the system controller(s), which may control operation of the vehicle 202 based at least in part on the instructions.

It should be noted that while FIG. 2 is illustrated as a distributed system, in alternative examples, components of the vehicle 202 may be associated with the simulation system 216 and/or other remote computing device(s). Additionally, any or all of the components of the simulation system 216 may be associated with and/or executed on the vehicle 202. That is, the vehicle 202 may perform one or more of the functions associated with the simulation system 216, and vice versa.

Figure 3:
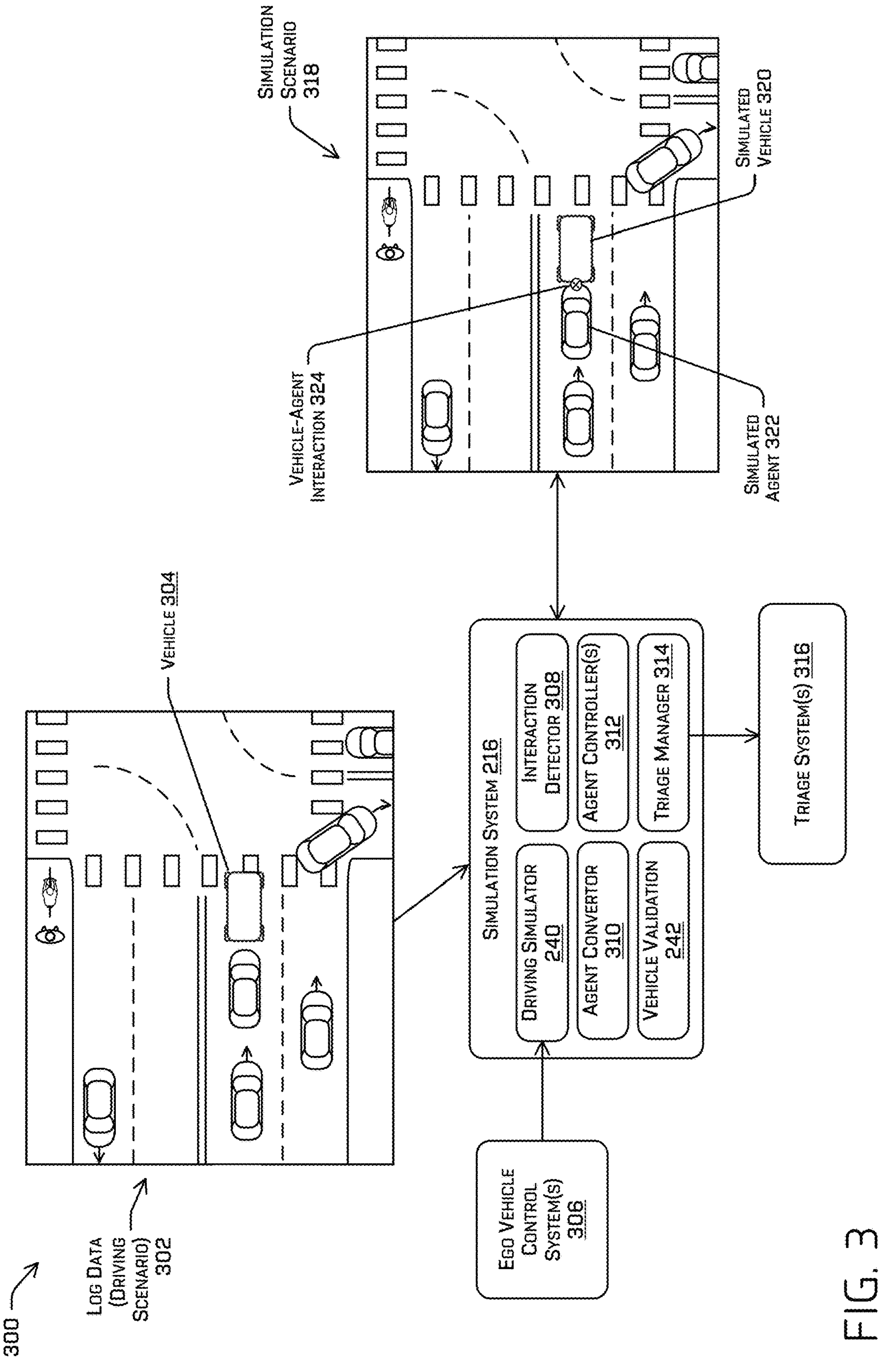
FIG. 3 is a block diagram illustrating an example simulation system configured to execute and evaluate log-based simulations based on driving scenarios, in accordance with one or more examples of the disclosure.

FIG. 3 depicts an example system 300 in which simulation system 216 is used to perform and evaluate a driving simulation based on the log data representing a driving scenario. As shown in this example, the simulation system 216 may receive log data representing a driving scenario 302 that may be used for executing a driving simulation. The driving scenario 302 may include data representing a real-world driving environment, data associated with a vehicle 304 in the environment (e.g., an initial starting state and an intended driving route and/or destination), and various additional objects populating the driving environment. The additional objects in the scenario 302 may include any number of static objects (e.g., road debris, disabled vehicles, false positive perception objects, etc.) and/or dynamic objects (e.g., other vehicles, bicycles, pedestrians, etc.), which can be positioned at various different positions and initial staring states (e.g., orientations, velocities, etc.) within the simulated environment. Within the driving scenario 302, the driving environment, the starting/ending state data for the simulated vehicle, and/or the additional objects in the environment may be determined based on log data captured by an autonomous vehicle (e.g., vehicle 304) in a real-world driving environment. In other examples, driving scenario 302 may be a synthetically-generated driving scenario, based on any combination of synthetic log data and/or synthetically-generated scenario data.

When the simulation system 216 executes a driving simulation based on the driving scenario 302, the simulated vehicle 304 (which also may be referred to as the ego vehicle in the simulation), may be controlled by the ego vehicle control system(s) 306 being tested and evaluated during the simulation. The ego vehicle control system(s) 306 may include any of the autonomous driving components of a vehicle 202 as described herein. In contrast, the other objects in the driving simulation may be controlled based on the log data of the driving scenario (which may be referred to as playback agents) or may be controlled by separate agent controller(s) 312 on the simulation system 216. The agent controllers 312 may include various ML-based agent models and/or heuristic-based algorithms configured to control various different agent types (e.g., simulated agent vehicles, simulated pedestrians, simulated bicycles, simulated animals, etc.) during a driving simulation.

The simulation system 216 may include various components to monitor, control, and validate driving simulations that are executed based on the driving scenario 302. As shown in this example, the simulation system 216 may include an interaction detector 308 configured to detect and analyze potential interactions between agents in driving simulation. The simulation system 216 also may include an agent convertor 310 configured to convert playback agents in the driving simulation (e.g., agent being controlled to correspond to the log data of the driving scenario 302) into smart agents that can be independently controlled to navigate the simulated environment. The simulation system 216 also may include one or more agent controller(s) 312 configured to control smart agents during the simulation, based on various driving rules, models, and/or parameters. Additionally, the simulation system 216 shown in this example may include a triage manager 314 associated with the vehicle validation component(s) 246. The triage manager 314 may be used to analyze the results of driving simulations performed by the simulation system 216, to determine the types/causes of particular simulation results and/or whether the simulation data should be provided to triage system(s) 316.

In this example, the simulation scenario 318 represents a driving simulation executed by the simulation system 216, based on the log data driving scenario 302. In the simulation scenario 318, a simulated vehicle 320 corresponding to vehicle 304 is controlled by the ego vehicle control system(s) 306. A number of additional objects and agents are present in the simulation scenario 318, which may include playback agents controlled entirety based on the log data driving scenario 302 and/or smart agents controlled by the agent controller(s) 312 of the simulation system 216.

As shown in this example, the simulation scenario 318 includes a vehicle-agent interaction at location 324. An interaction (or potential interaction) may represent a collision, near-miss collision, autonomous driving disengagement, and/or other undesirable outcome in a driving scenario. In this instance, the vehicle-agent interaction at location 324 may represent a collision between the simulated agent 322 and simulated vehicle 320. However, a similar collision did not occur in the driving scenario 302 on which the simulation scenario 318 is based. Thus, in this example, the vehicle-agent interaction in the simulation scenario 318 may be caused by the ego vehicle control system(s) 306 controlling the simulated vehicle 320 in a different manner than the vehicle 304 was controlled in the driving scenario 302. For instance, a software change in the ego vehicle control system(s) 306 may have caused the simulated vehicle 320 to stop earlier at the intersection (in front of the crosswalk), which resulted in the simulated agent 322 (a playback agent) colliding with the rear simulated vehicle 320.

This example illustrates how collisions and/or other agent interactions may occur in log-based driving simulations, as a result of changes to the ego vehicle control system(s) 306. Although the changes in the ego vehicle control system(s) 306 may be benign or may include driving improvements, these changes may nonetheless cause interactions or collisions because the other agents in the simulation scenario 318 are controlled unalterably by the log data and thus do not adapt to the new behavior of the simulated vehicle 320. In other examples, collisions and/or other agent interactions in log-based simulations may have causes, such as the simulation system 216 altering the map data or object data, adding or removing objects from the scene, etc.

According to various techniques described herein, the interaction detector 308 of the simulation system 216 may be configured to determine and analyze the trajectories of the simulated vehicle 320 and the simulated agent 322 within the simulation scenario 318. Based on determining an overlap of the trajectories at a particular time and location, the interaction detector 308 may identify the vehicle-agent interaction at location 324 as a potential interaction (e.g., potential collision) in the simulation. In some instances, based on identifying the potential interaction, the simulation system 216 may use the agent convertor 310 to convert the simulated agent 322 from a playback agent to a smart agent, at a sufficiently early time point during the simulation to allow the simulated agent 322 to avoid the collision. After the simulated agent 322 has been converted to a smart agent, from that point forward during the simulation, the simulated agent 322 may be controlled by an agent controller 312 rather than based on the unaltered log data. As described herein, the agent controller 312 may use a number of techniques to detect, analyze, and ultimately avoid the potential collision in a realistic manner consistent the driving behaviors of real-world drivers. These techniques, described below in more detail, may include determining right-of-way states of the agents involved in a potential collision, performing a headlock negotiation ML model and/or heuristic rules to determine when the simulated agent 322 should proceed when it should yield when a potential interaction is detected, and determining whether the simulated agent 322 is following, crossing paths, or merging with the simulated vehicle to provide more realistic driving behaviors for the simulated agent 322 during the simulation.

Additionally or alternatively, when an agent interaction such as a potential collision or other undesirable outcome is detected within a log-based simulation, the simulation system 216 may use the triage manager 314 to analyze the characteristics of the agent interaction in order to determine whether or not to triage the simulation for further analysis. To make this determination, the triage manager 314 may perform various techniques, described in more detail below, including heuristics-based classification and/or ML classification models to analyze the interaction (e.g., collision) in the simulation and determine whether the interaction is the result of playback agents failing to adapt to new driving behaviors of the ego vehicle control system(s) 306 which are benign or improvements, or whether the interaction is the result of new driving behaviors by the ego vehicle control system(s) 306 that are or potentially bad and/or driving behaviors.

Figure 4:
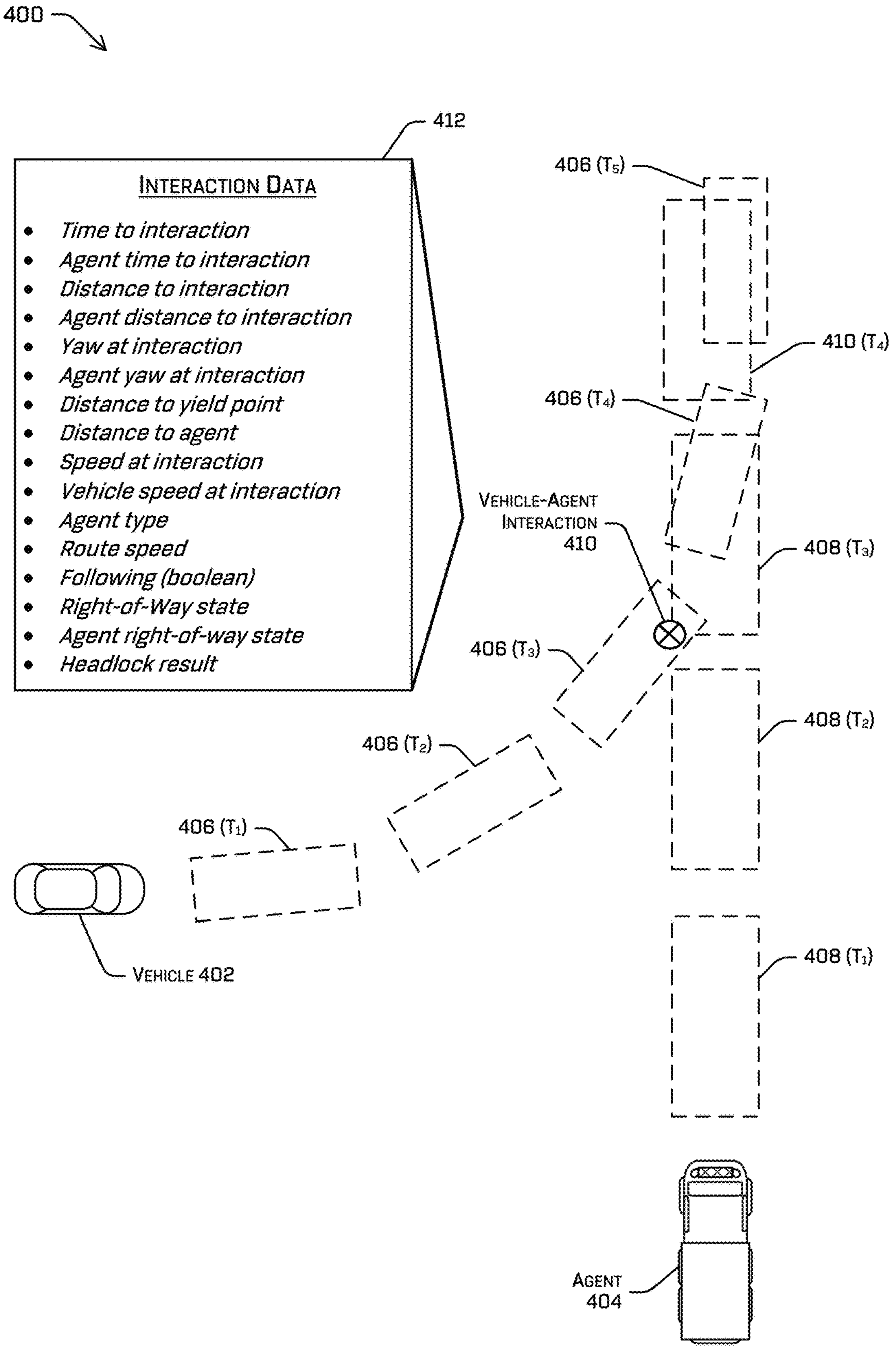
FIG. 4 depicts an example driving scenario including a potential interaction between a vehicle and an agent, in accordance with one or more examples of the disclosure.

Referring to FIG. 4, an example driving scenario 400 is shown including a potential interaction between a vehicle and an agent in a driving scenario. The driving scenario 400, which may be a real-world or simulated driving scenario, includes a vehicle 402 and an agent 404. Trajectories 406 and 408 are respectively associated with the vehicle 402 and the agent 404, and may depict the future positions of the objects (and/or a safety buffer) at a sequence of future time points. In this example, trajectory 406 and trajectory 408 may be represented by a series of bounding boxes labeled T1 through T5, indicating the predicted positions of the vehicle 402 and agent (potentially including a safety buffer) at different time steps along their respective trajectories.

As shown in this example, an analysis of the trajectories 406 and 408 (e.g., performed by an interaction detector 308) may determine a vehicle-agent interaction 410, representing the point at which the vehicle 402 and agent 404 are predicted to occupy the same space at the same future time in the (real or simulated) driving scenario. In some examples, the vehicle-agent interaction 410 may be referred to as a potential collision point. Based on detecting the vehicle-agent interaction 410, the simulation system 216 may generate various interaction data to characterize the potential interaction. Box 412 includes examples of interaction data that may characterize various aspects of the potential interaction between the vehicle 402 and the agent 404. The various interaction data may be determined based on the trajectories 406 and 408 and/or based on additional driving scenario data. Examples of potential interaction data in box 412 may include, but are not limited to, the predicted time for the vehicle 402 to reach the interaction (e.g., collision) point, the predicted time for the agent to reach the interaction point, the current distance between the vehicle 402 and the agent, the distance between the vehicle 402 and the interaction point, the distance between the agent 404 and the interaction point, the predicted yaw of the vehicle 402 and the agent 404 at the interaction point, the current speeds of the vehicle 402 and the agent 404, the predicted speeds of the vehicle 402 and the agent 404 at the interaction point, the right-of-way states of the vehicle 402 and the agent 404 at their current locations and/or at the interaction point, the result of a headlock negotiation operation between the vehicle 402 and the agent 404, and so on.

Figure 5A:
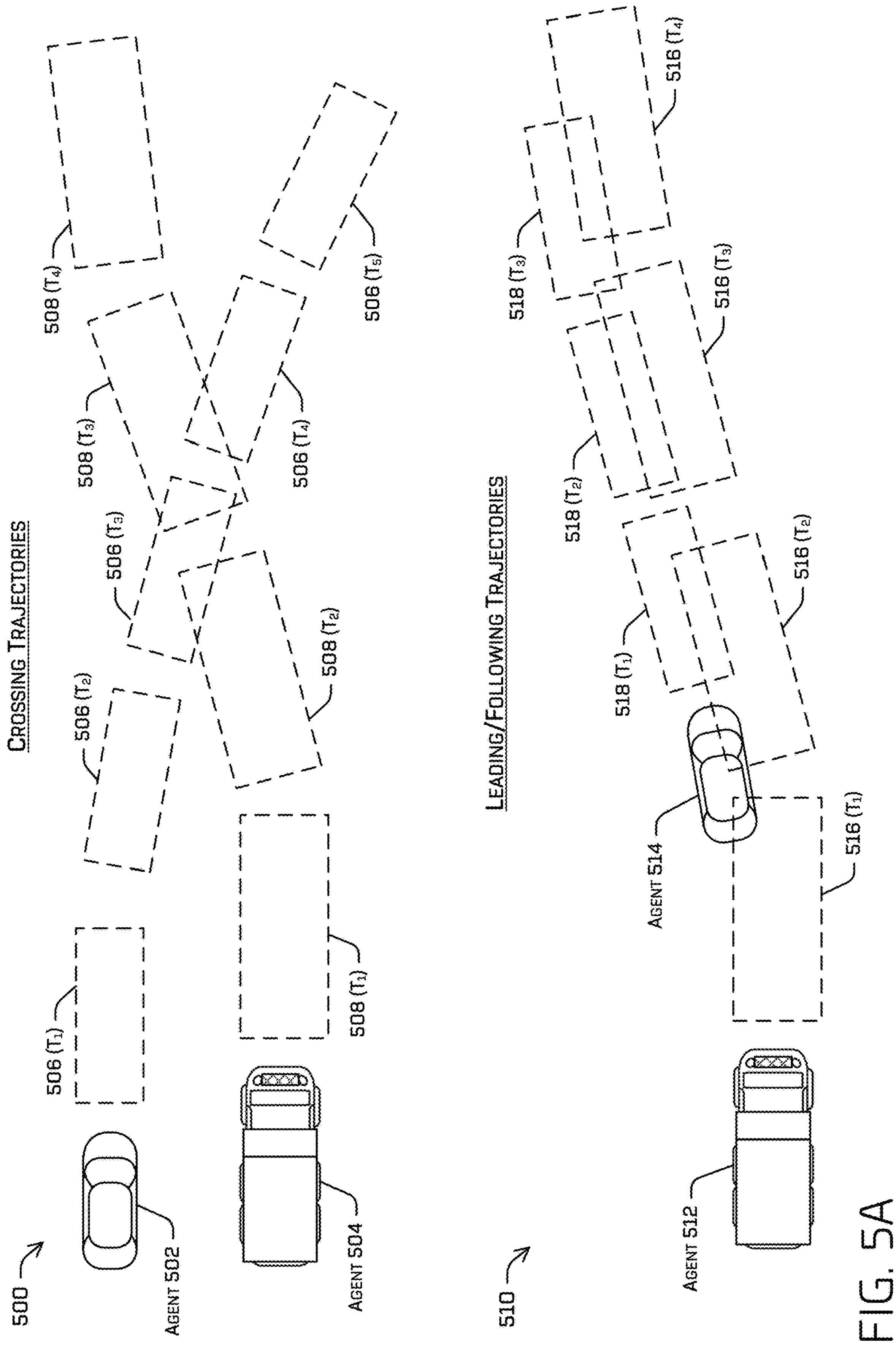
FIGS. 5A and 5B depict various examples of pairs of interacting agent trajectories, in accordance with one or more examples of the disclosure.
Figure 5B:
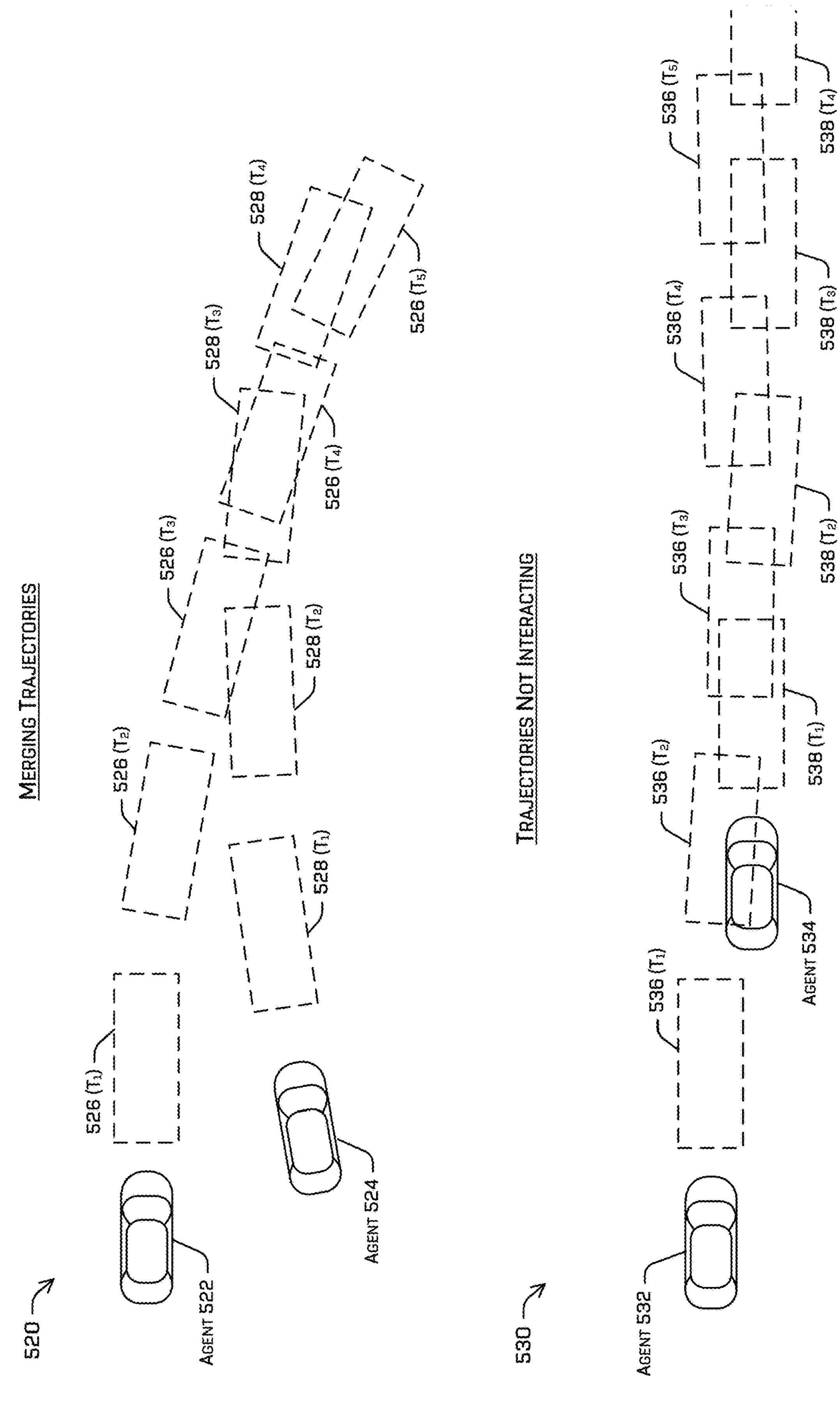

Referring to FIGS. 5A and 5B, several examples are shown of driving scenarios depicting pairs of agents having different types of potential interactions based on the respective trajectories of the agents. In FIG. 5A, a first example 500 shows a first agent 502 and a second agent 504 with overlapping crossing path trajectories. In this example, the first agent 502 is following a first agent trajectory 506, and the second agent 504 is following a second agent trajectory 508. Within the first agent trajectory 506 and second agent trajectory 508, sequences of predicted agent states at different time points are represented by a series of dashed rectangles labeled with time indicators (T1, T2, T3, T4, T5). In this example, the driving paths of the first agent 502 and the second agent 504 overlap at approximately time T3, and then continue on to cross paths following the potential interaction. In some examples, an interaction detector 308 may analyze the first agent trajectory 506 and the second agent trajectory 508 to determine various interaction characteristics (e.g., interaction data) of the potential interaction at time T3, including determining that the potential interaction is a crossing paths interaction. The interaction data characterizing the potential interaction between the first agent 502 and the second agent 504 may be stored as an interaction data structure/object.

A second example 510 shows a first agent 512 and a second agent 514 with overlapping leading and following trajectories. In this example, the first agent 512 is following a first agent trajectory 516, and the second agent 514 is following a second agent trajectory 518. As in the previous example, the first agent trajectory 516 and second agent trajectory 518 include sequences of predicted agent states corresponding to different time points, represented by a series of dashed rectangles labeled with time indicators (T1, T2, T3, T4, T5). In this example, the driving paths of the first agent 512 and the second agent 514 overlap at approximately time T3, while the first agent 512 is following the general driving path of the second agent 514. In some examples, an interaction detector 308 may analyze the first agent trajectory 516 and the second agent trajectory 518 to determine various interaction characteristics (e.g., interaction data) of the potential interaction at time T3, including determining that the potential interaction is a leading-following interaction. For example, the interaction detector 308 (and/or agent controller(s) 312) may determine that agent 512 is following agent 514 based on a determination that the trajectory of agent 512 overlaps with the current location of agent 514, and that the trajectories 516 and 518 overlap at a future time point. The interaction data characterizing the potential interaction between the first agent 512 and the second agent 514 may be stored as an interaction data structure/object.

In FIG. 5B, a third example 520 shows a first agent 522 and a second agent 524 with overlapping merging trajectories. In this example, the first agent 522 is following a first agent trajectory 526, and the second agent 524 is following a second agent trajectory 528. As in the previous examples, the first agent trajectory 526 and second agent trajectory 528 include sequences of predicted agent states corresponding to different time points, represented by a series of dashed rectangles labeled with time indicators (T1, T2, T3, T4, T5). In this example, the driving paths of the first agent 522 and the second agent 524 overlap at approximately time T3, while the first agent 522 is merging into the general driving path of the second agent 524. In some examples, an interaction detector 308 may analyze the first agent trajectory 526 and the second agent trajectory 528 to determine various interaction characteristics (e.g., interaction data) of the potential interaction at time T3, including determining that the potential interaction is a merging interaction. The interaction data characterizing the potential interaction between the first agent 522 and the second agent 524 may be stored as an interaction data structure/object.

A fourth example 530 shows a first agent 532 and a second agent 534 that do not have overlapping trajectories. In this example, the first agent 532 is following a first agent trajectory 536, and the second agent 534 is following a second agent trajectory 538. As in the previous example, the first agent trajectory 536 and second agent trajectory 538 include sequences of predicted agent states corresponding to different time points, represented by a series of dashed rectangles labeled with time indicators (T1, T2, T3, T4, T5). In this example, although the first agent 532 is following the general driving path of the second agent 534, the trajectories of the first agent 532 and the second agent 534 do not overlap during the driving scenario. Thus, the interaction detector 308 may analyze the first agent trajectory 536 and the second agent trajectory 538 to determine that no potential interaction is present between the first agent 532 and the second agent 534. As described herein, the lack of a potential interaction may indicate that both agents may execute their desired optimal trajectories without having to modify their trajectories to account for the other agent.

Figure 6A:
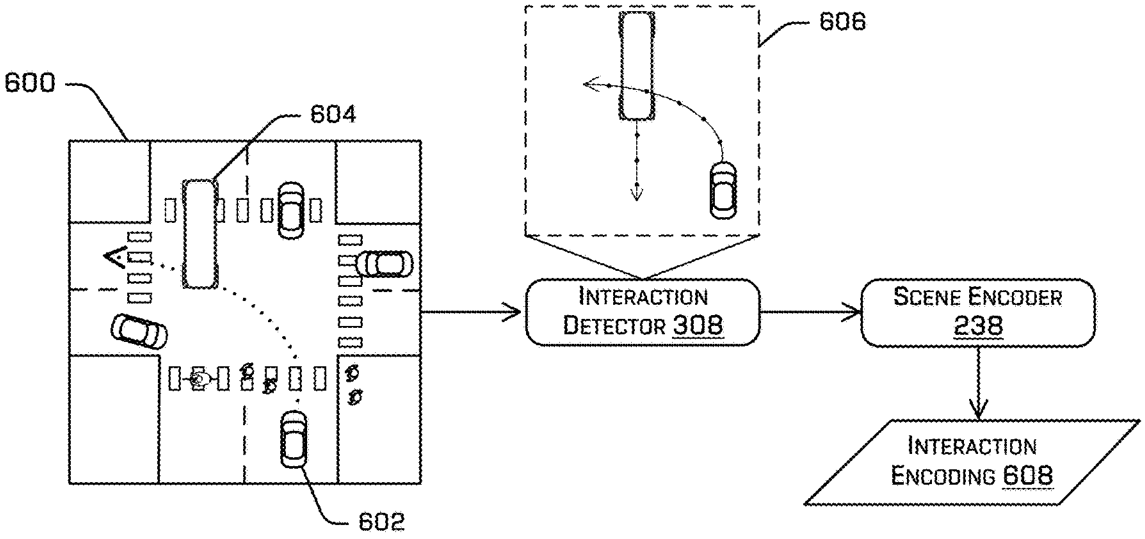
FIGS. 6A to 6C illustrate examples of a simulation system using an interaction detector and a scenario encoder to generate interaction encodings, scenario fragment encodings, and scenario encodings based on driving scenarios, in accordance with one or more examples of the disclosure.

Referring to FIG. 6A, an example technique is shown for detecting a potential agent interaction within a driving scenario 600 and encoding interaction data characterizing the agent interaction into an interaction encoding. In this example, the driving scenario 600 may be a real-world driving scenario (e.g., represented as vehicle log data) or a simulated scenario that may be executed as a driving simulation by a simulation system 216. The driving scenario 600 includes various static and/or dynamic objects, including a first agent 602 and a second agent 604. In various examples, either or both of agents 602 and 604 may be playback agents, smart agents, vehicles controlled by autonomous driving components, simulated vehicles controlled by ego vehicle control system(s) 306, and/or real-world agents controlled by human drivers.

In some examples, the interaction detector 308 may analyze the driving scenario 600 to determine a number of potential interactions between pairs (or larger groups) of agents. In this case, the interaction detector 308 may analyze the trajectories of the agents 602 and 604, and may determine a potential interaction between these agents based on overlapping agent trajectories and/or other criteria. Upon detecting the potential interaction between agents 602 and 604, the interaction detector 308 may extract interaction data characterizing various aspects of the potential interaction, including any combination of the interaction data described above in box 412 and/or other agent interaction data or agent-specific data. Box 606 represents the extraction of the agents 602 and 604 from the driving scenario 600 to indicate that, in this case, the interaction data may pertain only to the potential interaction between agents 602 and 604 and may not be affected by any other agents or potential interactions in the driving scenario.

After determining the interaction data representing the potential interaction, the interaction data may be provided to one or more scenario encoder(s) 238, which may generate an interaction encoding 608 associated with the potential interaction. In some examples, the interaction encoding 608 may be encoded using ML-based scenario encoders 240 trained to generate embeddings (e.g., feature vectors) representing particular agent interactions and/or complete driving scenarios. Additionally or alternatively, the interaction encoding 608 may be encoded using a rules-based encoding scheme such as agent interaction encoder(s) 242, in which various characteristics of the potential interaction between the agents 602 and 604 may be formatted, reduced, and stored in a predetermined (e.g., human interpretable) data structure or object.

Figure 6B:
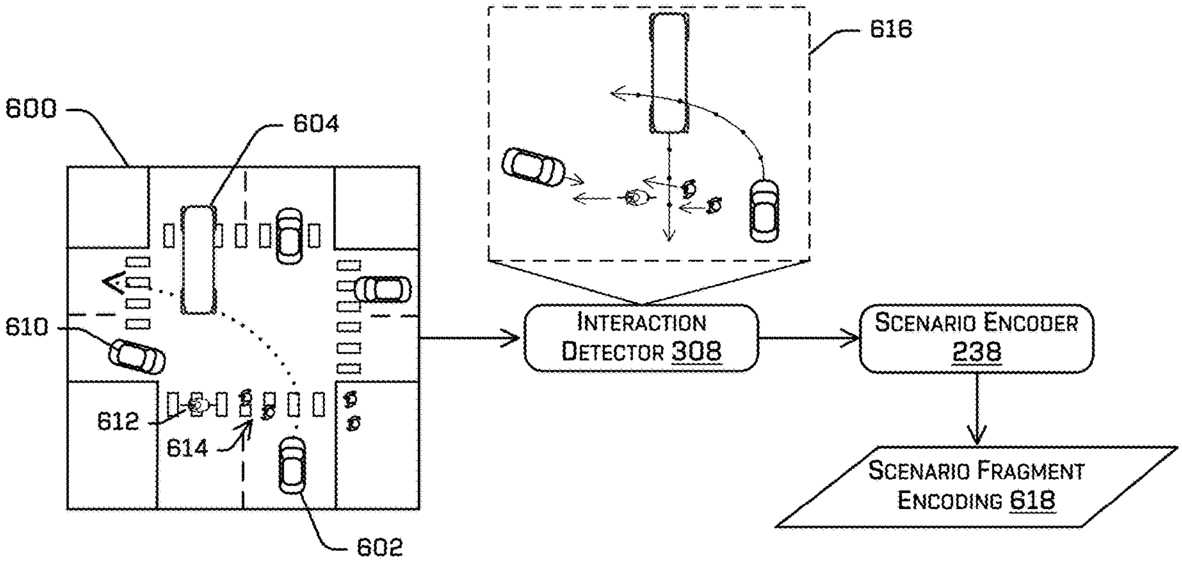

Referring to FIG. 6B, another example technique is shown for detecting a group of related interactions within a driving scenario 600 and encoding the interaction data characterizing the group of agent interactions into a scenario fragment encoding. The driving scenario 600 includes the same first agent 602 and second agent 604, as well as a number of additional interacting agents 610-614. As in the previous example, agents 602, 604, and 610-614 may be playback agents, smart agents, simulated agents, and/or real-world human-controlled agents.

As in the previous example, the interaction detector 308 may analyze the driving scenario 600 in FIG. 6B to determine a number of potential interactions between the various agents. In this case, the interaction detector 308 may be configured to analyze the trajectories of the various agents to determine a group of interacting agents. A group of interacting agents, which also may be referred to as a scene fragment, may refer to two or more agents that have potential interactions with other agents in the same scene fragment. For example, at the time depicted in the driving scenario 600: agent 602 may have a potential interaction with agent 604; agent 604 may have a potential interaction with agents 610, 612, and 614; agent 610 may have a potential interaction with agent 612; and agents 612 and 614 may have a potential interaction with agent 604 and/or agent 610. In this example, the interaction detector 308 may detect each of these potential agent-agent interactions, and may use the combination of interaction to define the related group of agents as a scene fragment.

After detecting the potential interactions and defining the scene fragment of related agents 602, 604, 610, 612, and 614, the interaction detector 308 may extract interaction data characterizing various aspects of each of the potential interactions within the scene fragment, including any combination of the interaction data described above in box 412 and/or other agent interaction data or agent-specific data. Box 616 represents the extraction of the agents in the scene fragment from the driving scenario 600 to indicate that, in this case, the interaction data may pertain only to the potential interactions between agents in the scene fragment, and may not be affected by any other agents or potential interactions in the driving scenario.

After determining the interaction data representing the potential interactions within the scene fragment, the interaction data for the scene fragment may be provided to one or more scenario encoder(s) 238, which may generate a scene fragment encoding 618 associated with the scene fragment. As noted above, the scene fragment encoding 618 may be a scene fragment embedding generated by an ML-based scenario encoder 240 and/or scene fragment encoding encoded using a rules-based encoding scheme (e.g., agent interaction encoder(s) 242) into a predetermined (e.g., human interpretable) data structure or object representing the scene fragment.

Figure 6C:
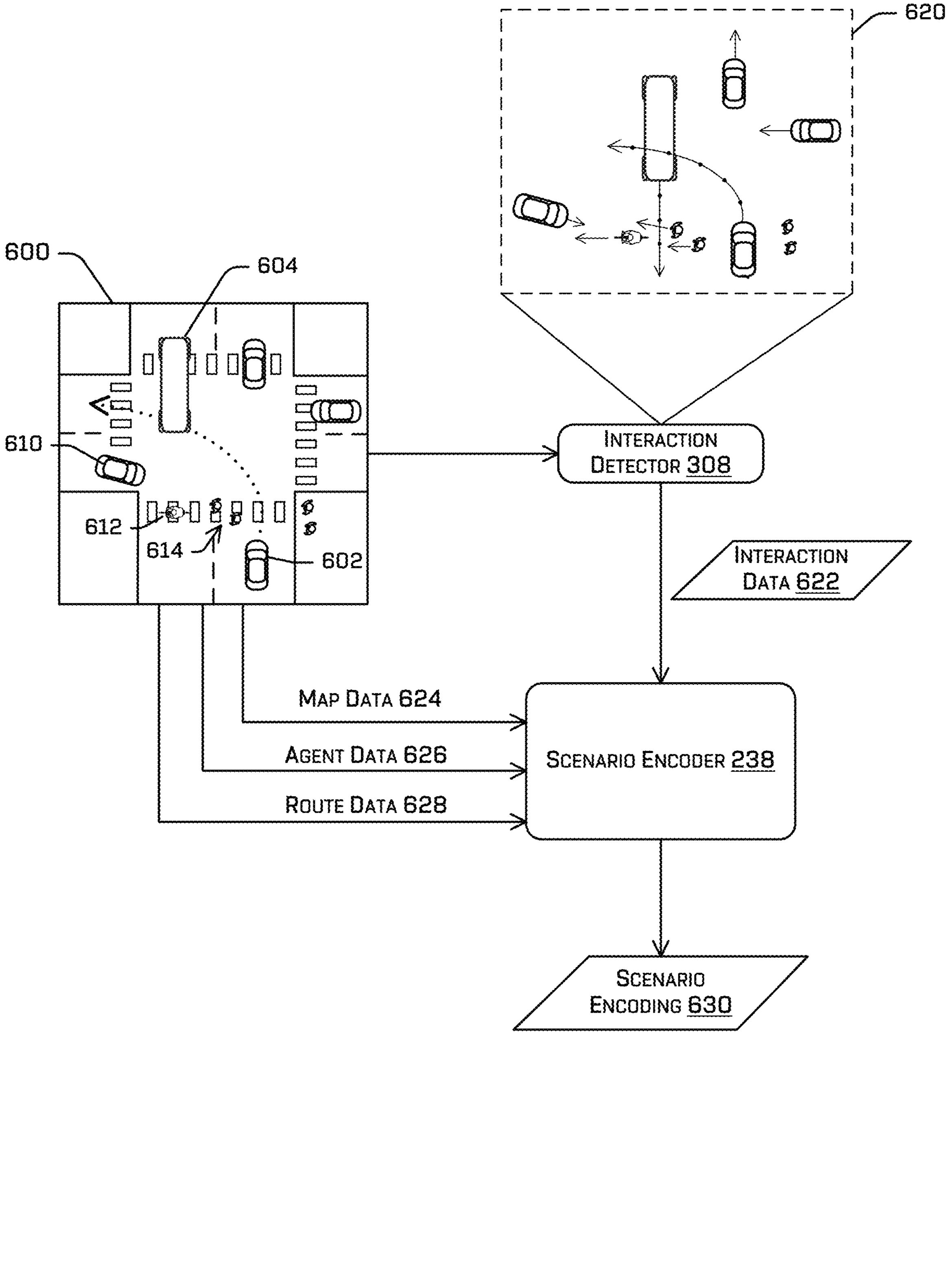

Referring to FIG. 6C, another example technique is shown for detecting all of the agent interactions in a driving scenario 600 and encoding the interaction data characterizing the complete set of agent interactions into a scenario encoding. The driving scenario 600 in this example may correspond to the same driving scenario described above in FIGS. 6A and 6B.

In this example, the interaction detector 308 may analyze the entire driving scenario 600 to determine all potential interactions between various pairs of agents in the driving scenario. Box 620 may represent the extraction of all agents in the driving scenario 600 that are involved in a potential interaction with at least one other agent in the scenario. For each of the potential interactions, the interaction detector 308 may analyze the overlapping trajectories of the agents to determine a set of interaction data. The interaction data 622 may represent the aggregated sets of the interaction data for all of the potential interactions at a particular time in the driving scenario 600. Thus, for any agents not involved in potential interactions with any other agents at that time in the driving scenario 600, those agents may be excluded from the interaction data 622.

After determining the interaction data 622 representing the complete driving scenario 600, the interaction data 622 may be provided to one or more scenario encoder(s) 238, which may generate a scenario encoding 630 associated with the driving scenario 600. As noted above, the scenario encoding 630 may be a driving scenario embedding generated by an ML-based scenario encoder 240 and/or a scenario encoding encoded using a rules-based encoding scheme (e.g., agent interaction encoder(s) 242) into a predetermined (e.g., human interpretable) data structure or object representing the scene fragment.

As shown in FIG. 6C, in some examples, the scenario encodings based on interaction data 622 also may be based on additional types of scenario-related data. In this example, the scenario encoder 238 may be a heuristics-based encoder configured to receive map data 624, agent data 626, and/or route data 628 along with the agent interaction data 622, and the scenario encoding 630 may contain elements of all of these data.

Similar to the interaction data 622, each of the additional types of data shown in this example (e.g., map data 624, agent data 626, route data 628, and/or other dimensions of scenario data not shown in this example) may correspond to the output of separate type-specific ML models and/or type-specific heuristic data. The various data types may provide valuable context and information to enhance the scenario encoding process.

The examples of additional data types shown in FIG. 6C are non-exhaustive. For instance, road/lane data may be incorporated into the map data 624 and/or included as separate data provided to the scenario encoder(s) 238. Such road/lane data may provide structural information about particular road elements, including whether a road segment is a junction, the state of traffic lights, the number of lanes in a road, speed limits, and various other annotations. Additionally, "shape" information depicting the appearance of the road network may be included in road/lane data.

In some examples, junction data also may be incorporated into the scenario encoding 630. Junction data may include, for example, information about stop lines and traffic light similarity, which can be important for understanding complex intersections and their impact on agent interactions.

In some examples, traffic light data may be directly encoded into the scenario encoding 630. Traffic light data may include the state of traffic lights (e.g., green, yellow, red) at various points in the driving scenario, which may provide important context for agent behaviors and interactions.

In some examples, route data also may be included in the scenario encoding 630 (e.g., using an aggregation metric). A route may be defined as a sequence of roads (e.g., lanes) and/or junctions over time. In some implementations, the sequence of positions in a route may be encoded over time, and sampled at a particular frequency (e.g., 10 Hz and/or or the rate of a driving simulation) to ensure that the sequences have the same length.

In some examples, trajectory data also may be incorporated into the scenario encoding 630. In such examples, a trajectory may be defined by a sequence of absolute positions in an associated driving environment, providing detailed information about the movement of agents over time.

In some examples, obstacle information (which can be dynamic or static) may be included as a structured set of features within the scenario encoding 630. Some examples of these features may include bounding box dimensions, orientation/yaw, and obstacle classification. Obstacle information may be valuable for understanding the physical characteristics and behaviors of objects in the driving scenario 600.

The approach illustrated in FIG. 6C, in which different aspects/dimensions of the driving scenario 600 are separately modeled and/or encoded, before being combined into a single scenario encoding 630, may offer several advantages over existing techniques. One key advantage is the interpretability (fully or partially) of the scenario encoding 630, in contrast to fully ML-based scenario encoders that generate non-human-interpretable scenario embeddings (e.g., feature vectors). By using a weighted combination of interpretable features, it may be possible to understand why a particular scenario classification or scenario similarity determination was made. Examining the weights and individual scores of the sub-problems may provide a blueprint explanation for scenario similarity and/or dissimilarity.

Additionally, unlike ML-based scenario embeddings, this approach may allow weights associated with particular types/dimensions of scenario data to be manually tuned to fit desired downstream use cases transparently and without specific model training. This flexibility can be beneficial for use cases where specific aspects of the driving environment need to be emphasized or de-emphasized based on the particular application or analysis being performed. Additionally, this technique may exploit the highly structured nature of driving scenarios to reduce the number of tunable parameters. As a result, less data may be required to find the optimal parameters for a reasonable scenario similarity definition. This can be particularly advantageous in situations where large amounts of training data are not available or when rapid iteration and adjustment of the scenario encoding process may be necessary.

Figure 7:
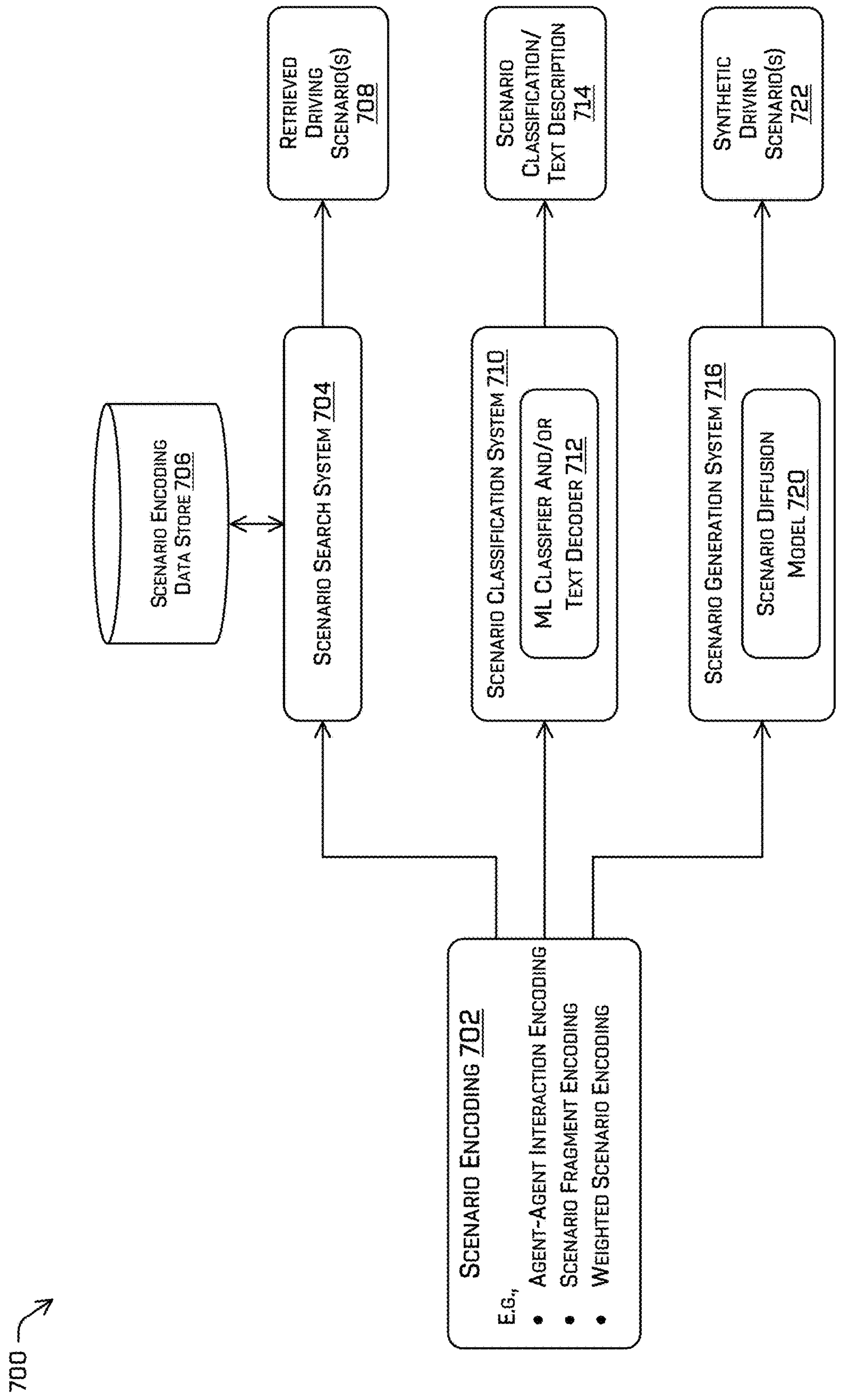
FIG. 7 is a block diagram illustrating an example system configured to perform various tasks based on driving scenario encodings, including scenario searching and retrieval, scenario classification, and synthetic scenario generation, in accordance with one or more examples of the disclosure.

Referring to FIG. 7, an example system 700 is depicted for processing and utilizing scenario encodings in various downstream tasks. The scenario encoding 702 in this example may represent an encoding of a single agent interaction (e.g., an interaction encoding 608), an encoding of a scene fragment (e.g., scene fragment encoding 618), or an encoding representing a complete driving scenario (e.g., scenario encoding 630). In each of these examples, the scenario encoding 702 may represent a single point in time during a driving scenario or may represent the driving scenario at multiple instances over a duration of time. For example, the process of generating the individual encodings described above in FIGS. 6A-6C may be performed iteratively at multiple time points during a driving scenario. In these examples, each of the individual time-specific encodings (e.g., multiple agent interaction encodings 608, multiple scene fragment encodings 618, multiple scenario encodings 630) may be combined into a single encoding representing the driving scenario over the duration of time.

As shown in this example, the system 700 may include downstream subsystems configured to use the encodings described above to perform various functionality relating to analyzing, classification, retrieving, and generating driving scenarios. In this example, the system 700 includes a scenario search system 704, a scenario classification system 710, and a scenario generation system 716. Each of these subsystems may be implemented on the simulation system 216 and/or may be implemented within separate computing environments (e.g., large-scale cloud environments for driving scenario search, retrieval, generation, etc.). In some examples, each such subsystem and/or downstream implementation may include one or more of the scenario encoder(s) 238 described herein for encoding agent interaction data and/or other types of scenario data.

In various examples, the scenario encoder(s) 238 and/or corresponding scenario encodings 702 may be used by the various downstream systems to perform tasks such as (but not limited to) retrieval of driving scenarios, description and/or classification of driving scenarios, generation of synthetic driving scenarios, and the like. In these examples, the scenario encoder(s) 238 may provide technical advantages and efficiencies by performing the various downstream tasks without requiring generating or training task-specific models, or any task-specific modifications to the architecture of the encoder(s). As described above, in some implementations, the scenario encoder(s) 238 may apply different similarity weights for different data types and/or dimensions of a driving scenario (e.g., different weights for agent interaction data 622, map data 624, agent data 626, route data 628, etc.), depending on the requirements or characteristics of the downstream functionality.

In some implementations, scenario encodings 702 generated based on agent interactions and/or various other techniques described herein may be used as input to a scenario search system 704. In some examples, the scenario search system 704 may receive a particular scenario encoding 702 as input and may be configured to retrieve similar scenario encodings from a scenario encoding data store 706. For fully or partially interpretable scenario encodings, the scenario search system 704 may apply various heuristics (e.g., weighted similarity values for interaction data, map data, etc.) to determine the most similar scenario encodings from the scenario encoding data store 706. Additionally or alternatively, the scenario search system 704 may be configured to receive text data and retrieve one or more driving scenarios from the scenario encoding data store 706 based on the text data. In various examples, the scenario search system 704 may be configured to retrieve the N most similar driving scenarios and/or all driving scenarios within a similarity threshold, which may be output as retrieved driving scenarios 708. Additional examples and techniques for implementing and using driving scenario search systems are described in U.S. patent application Ser. No. 18/526,999, filed Dec. 1, 2023, and entitled "Multimodal Masked Driving Scene Encoder," the contents of which are incorporated herein by reference in their entirety for all purposes.

Additionally, in some implementations, scenario encodings 702 generated based on agent interactions and/or various other techniques described herein may be used as input to a scenario classification system 710. In some examples, the scenario classification system 710 may receive a scenario encoding 702 as input, and may be configured to evaluate (and/or decode) scenario encoding 702 into corresponding text description and/or classification data. In some examples, the scenario classification system 710 may use one or more of an ML classification model(s) and/or text decoder(s) 712 to decode the scenario encoding 702 into text data and/or class labels such as driving scenario categories/subcategories, labels, and/or natural language text descriptions 714 determined based on the scenario encoding 702. Additional examples and techniques for implementing and using driving scenario classification systems are described in U.S. patent application Ser. No. 18/526,999, filed Dec. 1, 2023, and entitled "Multimodal Masked Driving Scene Encoder," the contents of which are incorporated herein by reference in their entirety for all purposes.

Further, in some implementations, scenario encodings 702 generated based on agent interactions and/or various other techniques described herein may be used as input to a scenario generation system 716. In some examples, the scenario generation system 716 may receive a scenario encoding 702 as input, and may be configured to generate a synthetic driving scenario 722 based on the scenario encoding 702. For instance, the scenario encoding 702 provided to the scenario generation system 716 may comprise a single agent-agent interaction encoding or a scene fragment encoding, and the scenario generation system 716 may use a generative ML model (e.g., a scene diffusion model 720) trained to generate realistic synthetic driving scenarios based on partial scenarios (e.g., one or more interaction encodings). Additional examples and techniques for implementing and using synthetic scenario generation systems are described in U.S. patent application Ser. No. 18/386,905, filed Nov. 3, 2023, and entitled "Machine-Learned Models For Generating Perturbed Driving Scenarios For Simulation," the contents of which are incorporated herein by reference in their entirety for all purposes.

Figure 8:
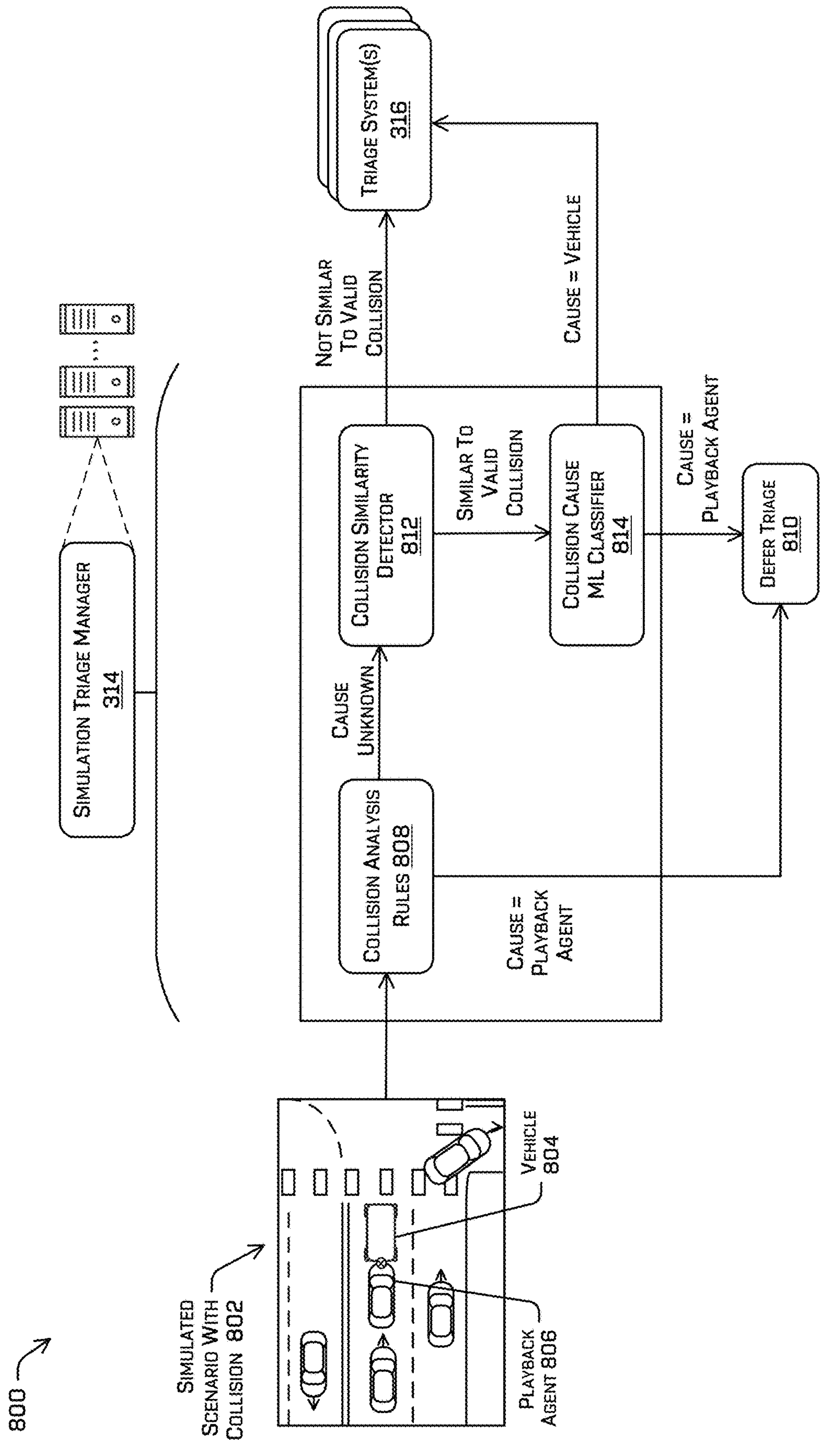
FIG. 8 illustrates an example of a simulation system using a simulation triage manager to triage log-based driving simulations that include collisions, in accordance with one or more examples of the disclosure.

Referring to FIG. 8, a system 800 is shown including a simulation triage manager 314 configured to analyze and triage log-based driving simulations that include collisions (and/or other undesirable simulation results). In this example, the simulation triage manager 314 may receive the results of a simulated scenario 802, during which a collision occurred between a vehicle 804 and a playback agent 806. As described above, collisions (and/or other undesirable agent interactions) may occur in log-based driving simulations as a result of changes to the vehicle controllers used to control the behavior of the vehicle 804 during the simulation (e.g., ego vehicle control system(s) 306). Playback agents, in contrast, may be controlled unalterably based on the log data and may be unable to adapt to the new behavior of the simulated vehicle 804, potentially leading to collisions that did not occur in the original log data upon which the log-based scenario is based.

In this example, the simulation triage manager 314 may implement a combination of various techniques to analyze and triage log-based simulations including collisions. In some instances, the collision analysis process performed by the simulation triage manager 314 may begin with a set of collision analysis rules 808, which may be heuristics-based criteria used to evaluate the simulated scenario 802 to attempt to determine whether the collision was caused by the failure of the playback agent 806 to respond reasonably to changes in the behavior of the simulated vehicle 804. If so, then the "cause" of the collision may be determined to be the playback agent 806 and the simulation triage manager 314 may send the scenario to a defer triage module 810. Scenarios sent to the defer triage module 810 may be counted as false positive collisions (e.g., not attributable to the vehicle controllers controlling the simulated vehicle 804) without the need for any additional manual and/or automated scenario triage operations (but may be stored for potential future triage). In contrast, when the collision analysis rules 808 cannot determine that the collision was caused by a failure of the playback agent 806, the simulation triage manager 314 may invoke the collision similarity detector 812 and/or collision cause ML classifier 814 to future evaluate the simulated scenario 802.

The collision similarity detector 812 may be configured to compare the simulated scenario 802 to other known scenarios including valid collisions. As described below, the similarity detector 812 may be implemented using one or more scenario encoder(s) 238. For instance, the similarity detector 812 may use an ML-based scenario encoder 240 to encode the simulated scenario 802 into a scenario embedding (e.g., a feature vector in a scenario embedding vector space). Within the vector space, the similarity detector 812 may compare the embedding of the simulated scenario 802 to other embeddings of valid (e.g., true positive) collisions. When the embedding is sufficiently similar to the embedding of at least one valid collision scenario (e.g., within a threshold radius in the scenario embedding vector space), the simulated scenario 802 may be considered to be in-distribution with respect to the ML collision cause classifier 814, and therefore may be provided as input to the ML collision cause classifier 814 for a collision analysis. In contrast, when the embedding of the simulated scenario 802 is not sufficiently similar to the embedding of at least one valid collision scenario, then the simulated scenario 802 may be considered out-of-distribution with respect to the ML collision cause classifier 814, and therefore cannot be evaluated with sufficient confidence by the collision cause ML classifier 814. In such cases, any simulated scenario determined to be out-of-distribution by the similarity detector 812 may be provided to one or more triage systems 316 for additional manual and/or automated collision triage operations.

The collision cause ML classifier 814, when invoked, may use a trained neural network to determine whether the cause of the collision in the simulated scenario 802 is attributable to the failure of the playback agent 806 to behave reasonably (e.g., realistically) in view of the changed behavior by the simulated vehicle 804, or whether the cause of the collision is attributable to risky or otherwise undesirable driving behaviors of the simulated vehicle 804. The collision cause ML classifier 814 may be using supervised learning techniques based on labeled samples of collisions attributable to playback agents and/or attributable to simulated vehicles. As described below, the collision cause ML classifier 814 may be implemented using a pretrained foundation model for encoding driving scenarios, and a separate classifier head and/or model (e.g., a multilayer perceptron (MLP)) trained to classify the collision into one or more collision types and/or causes. If the collision cause ML classifier 814 determines that the likely cause of the collision is risky or undesirable driving behaviors by the simulated vehicle 804 (which is being controlled by an ego vehicle control system(s) 306), then the simulation triage manager 314 may transmit the simulated scenario (e.g., as log data or a scenario encoding) to one or more of the triage systems 316. In contrast, if the collision cause ML classifier 814 determines that the likely cause of the collision is a failure of the playback agent 806 to behave reasonably and/or realistically during the simulation, then the simulation triage manager 314 may count the simulation collision as a false positive (e.g., not attributable to the vehicle controllers controlling the simulated vehicle 804) and send the scenario to the defer triage module 810.

Figure 9:
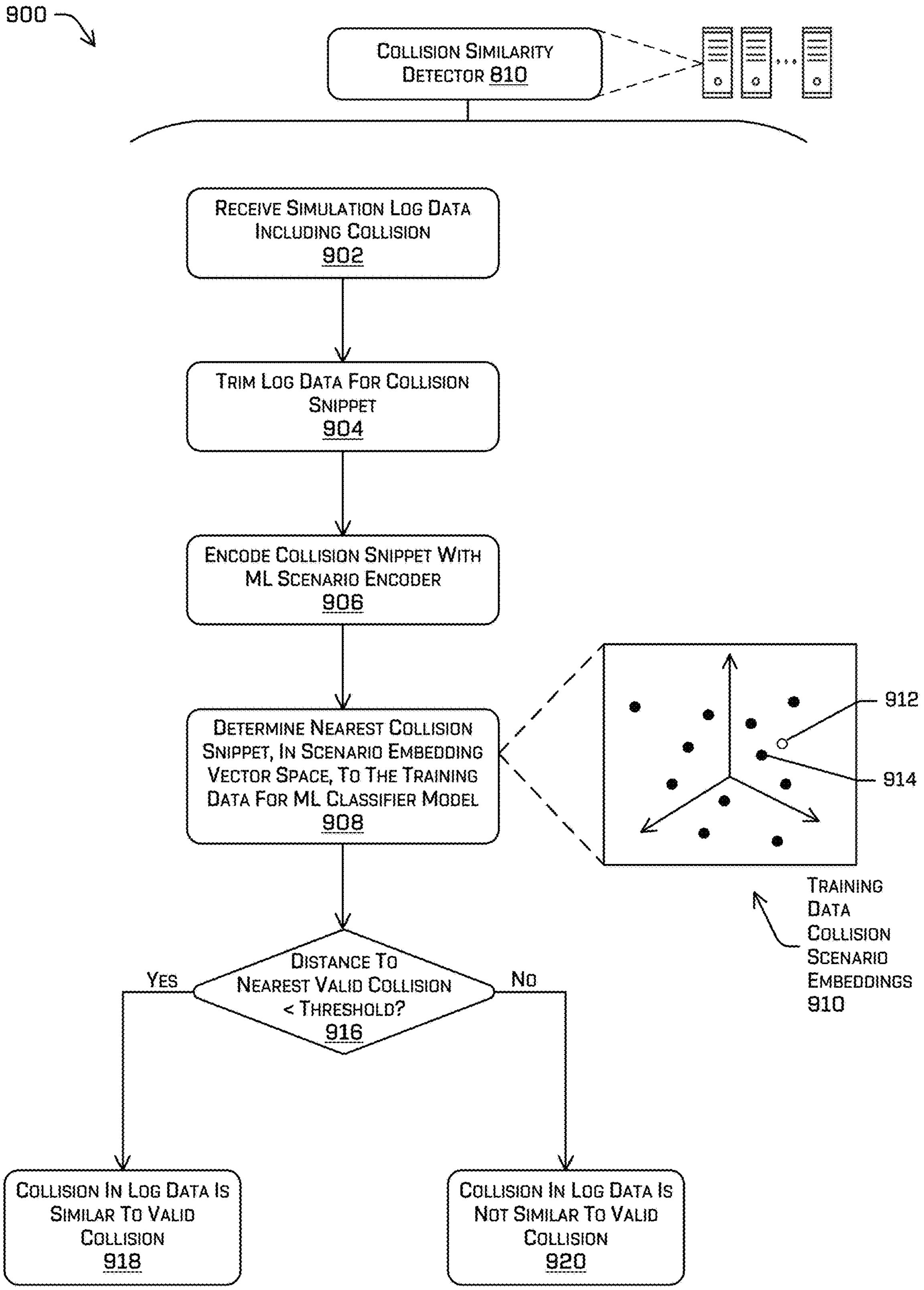
FIG. 9 illustrates a flow diagram of an example process performed by a collision similarity detector associated with a simulation triage manager, in accordance with one or more examples of the disclosure.

Referring to FIG. 9, a flowchart is shown illustrating an example process 900 to be performed by a collision similarity detector 812. As noted above, process 900 may be performed by the collision similarity detector 812 to determine whether or not a simulated scenario 802 including a collision is similar to a valid (or true positive) collision scenario, or to a cluster of valid collision scenarios. When the collision similarity detector 812 determines that the simulated scenario 802 is sufficiently similar to one or more valid collision scenarios, the simulation system 216 may conclude that the simulated scenario 802 is in-distribution with respect to the collision cause ML classifier 814 (and thus that the collision cause ML classifier 814 may be used to classify the cause/type of the simulated scenario 802 with sufficient confidence of the output). In contrast, when the collision similarity detector 812 determines that the simulated scenario 802 is not sufficiently similar to one or more valid collision scenarios, the simulation system 216 may conclude that the simulated scenario 802 is out-of-distribution with respect to the collision cause ML classifier 814 (and thus that the collision cause ML classifier 814 cannot be used to classify the cause/type of the simulated scenario 802 with sufficient confidence).

At operation 902, the collision similarity detector 812 may receive log data representing a simulated scenario 802 that includes a collision. In some aspects, the log data may contain information about the simulated driving environment, the vehicle/agent trajectories, and/or other relevant data relating to the collision event.

At operation 904, the collision similarity detector 812 may trim the log data associated with the simulation scenario 802 at a predetermined time relative to the collision. In some examples, the log data may be trimmed to create a collision snippet of a predetermined length (e.g., 10 seconds), within which the collision occurs at a predetermined time (e.g., at the end of the 10-second snippet). This trimming process may improve the accuracy of the similarity analysis described below, by creating snippets of a uniform size and temporally aligning the collision events within the snippets.

At operation 906, the collision similarity detector 812 may use an ML-based scenario encoder 240 to encode the collision snippet generated in operation 904. The result of this encoding process may be a scenario embedding, which in some cases may be represented as a feature vector (e.g., not human-interpretable) in a scenario embedding vector space. This encoding step may allow for efficient and accurate comparison of collision scenarios by first encoding them into reduced-sized feature vectors that nonetheless retrain the meaning and/or context of the agent interactions within the scenario.

At operation 908, the collision similarity detector 812 may determine a nearest distance between the scenario embedding and another scenario embedding within a data store of embeddings of valid collision scenarios. In some examples, operation 908 may include determining the nearest distance between the scenario embedding and a cluster of valid collision scenarios (e.g., rather than a single valid collision scenario). In such examples, the collision similarity detector 812 may be configured to an unsupervised clustering algorithm to determine clusters of valid (e.g., true positive) scenario collisions. Such clustering algorithms may take various forms, including (but not limited to) using k-means to generate cluster centroids and radii, using DB-Scan to generate cluster centroids and radii, or using a hand-selected set of representative tickets as centroids with a hand-coded conservative radius.

As shown in this example, graph 910 depicts an example scenario embedding space, in which the scenario embedding 912 is depicted as a dot representing the collision snippet of the simulated scenario 802. The additional (blackened) dots in graph 910 may represent embeddings of collision scenarios used as training data for training the ML classifier 814. Each of the additional (blackened) dots in graph 910 may represent a collision caused by failure of the playback agent 806 to behave reasonably/realistically during the simulation or caused by risky or undesirable driving behaviors by the simulated vehicle 804. In various examples, each of these additional dots may represent a single training scenario used as training data to ML classifier 814 or may represent a cluster of similar training scenarios within the training data (e.g., nearby within the vector space).

At operation 916, the collision similarity detector 812 may determine a distance (e.g., radius) between the scenario embedding 912 and the nearest valid scenario embedding (and/or cluster) 914 within the scenario embedding vector space. This distance calculation may serve as a measure of similarity between the current collision and the closest known valid collision scenario(s).

In this example, when the distance between the scenario embedding 912 and the nearest valid collision (or cluster) is less than a threshold value (916: Yes), this may indicate that the scenario embedding 912 is sufficiently similar to one or more known valid collision scenarios. In such cases, at operation 918, the scenario embedding 912 may be considered to be in-distribution with respect to the collision cause ML classifier 814, and thus the collision cause ML classifier 814 may be used to classify the cause and/or type of the simulated scenario 802 with a sufficient degree of confidence in the classification.

In contrast, when the distance between the scenario embedding 912 and the nearest valid collision (or cluster) is greater than the threshold value (916: No), this may indicate that the scenario embedding 912 is not sufficiently similar to any known valid collision scenarios (or clusters of scenarios). In such cases, at operation 920, the scenario embedding 912 may be considered to be out-of-distribution for the collision cause ML classifier 814, and thus the collision cause ML classifier 814 cannot be used to classify the cause and/or type of the simulated scenario 802 with sufficient confidence.

In some implementations, the threshold value used in operation 916 may be adjustable based on various factors, such as the desired sensitivity of the similarity detection or the characteristics of the scenario embedding space. The collision similarity detector 812 may also employ different distance metrics or similarity measures depending on the specific requirements of the analysis.

Figure 10:
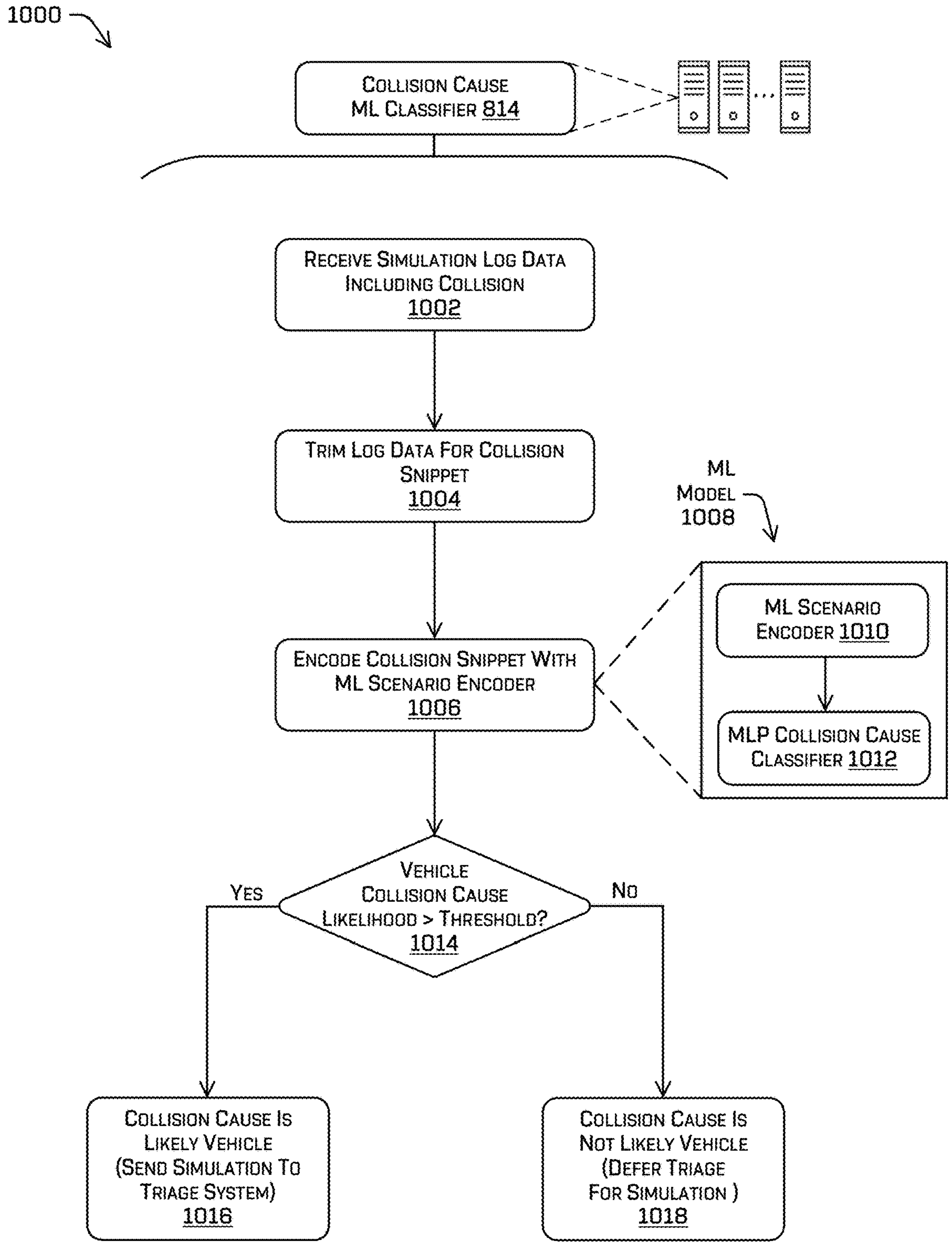
FIG. 10 illustrates a flow diagram of an example process performed by a collision cause ML classifier model associated with a simulation triage manager, in accordance with one or more examples of the disclosure.

Referring to FIG. 10, a flowchart is shown illustrating an example process 1000 that may be performed by a collision cause ML classifier 814 to classify causes (and/or types or other attributes) of collisions observed in driving simulations. As discussed above, true positive collisions in log-based driving simulations (e.g., collisions caused by bad or risky driving behavior of the simulated vehicle 804) may be scarce/low-frequency, relative to false positive collisions (e.g., collisions caused by playback agents being unable to react reasonably or realistically to benign or good driving behavior by the simulated vehicle 804). Therefore, it may be difficult is some instances to obtain a large number of true positive collision scenarios in simulations for sufficiently training the collision cause ML classifier 814. Thus, in some examples, the collision cause ML classifier 814 may perform process 1000 after a determination by the collision similarity detector 812 that the simulated scenario 802 is in-distribution with respect to the collision cause ML classifier 814.

At operation 1002, the collision cause ML classifier 814 may receive log data representing a simulated scenario 802 that includes a collision. In some aspects, the log data may contain information about the simulated driving environment, the vehicle/agent trajectories, and/or other relevant data relating to the collision event.

At operation 1004, the collision cause ML classifier 814 may trim the log data associated with the simulation scenario 802 at a predetermined time relative to the collision. In some examples, the log data may be trimmed to create a collision snippet of a predetermined length (e.g., 10 seconds), within which the collision occurs at a predetermined time (e.g., at the end of the 10-second snippet). This trimming process may improve the accuracy of the similarity analysis described below, by creating snippets of a uniform size and temporally aligning the collision events within the snippets.

At operation 1006, the collision cause ML classifier 814 may encode and then classify the collision snippet generated in operation 1004, to determine a cause (and/or type or other attribute) of the collision in the simulated scenario 802. As shown in this example, the collision cause ML classifier 814 may use a trained ML model 1008 having a multilayer ML component architecture to perform the classification. An initial ML component (or set of neural network layers) may correspond to a pretrained ML scenario encoder 1010 (e.g., an ML scenario encoder 240) configured to encode driving scenarios into scenario embeddings. The output of the ML scenario encoder 1010 (e.g., a scenario embedding of the collision snippet) may be provided to the subsequent ML component (e.g., a multilayer perceptron (MLP) classifier head 1012, transformer, and/or other neural network), which may be trained classify the cause, type, and/or other characteristics of the collision based on a scenario embedding from the ML scenario encoder 1010. In some implementations, the MLP classifier head 1012 may be trained using supervised learning techniques based on labeled ground truth collision scenarios. This training approach may allow the model to learn patterns and features associated with different types of collisions and their causes.

At operation 1014, the collision cause classifier 814 may evaluate the output of the ML model 1008. This evaluation may involve determining whether the likelihood that the collision was caused by a risky or undesirable driving behavior of the simulated vehicle 804 exceeds a probability threshold. In some examples, the threshold may be adjustable based on various factors, such as the desired sensitivity of the classification or the characteristics of the simulation scenario.

When the likelihood that an undesirable behavior of the simulated vehicle 804 caused the collision exceeds the threshold (1014: Yes), then process 1000 may proceed to operation 1016. At operation 1016, the collision cause classifier 814 may classify the collision cause as a likely vehicle-caused collision. In some aspects, this classification may indicate that the collision in the simulated scenario 802 is attributable to the behavior (e.g., improper or risky driving) of the simulated vehicle 804. When this occurs, the collision cause classifier 814 may send the simulated scenario 802 to one or more triage systems 316 for further analysis.

In contrast, when the likelihood that an undesirable behavior of the simulated vehicle 804 caused the collision does not exceed the threshold (1014: No), then process 1000 may proceed to operation 1018. At operation 1018, the collision cause classifier 814 may classify the collision cause as a not likely vehicle-caused collision. In some implementations, this classification may indicate that the cause of the collision in the simulated scenario 802 is not attributable to the behavior of the simulated vehicle 804, and thus that the collision does not need to be triaged. In such cases, the collision cause classifier 814 may send the simulated scenario 802 to the defer triage module 810, which may count the collision as a false positive without the need for additional manual or automated scenario triage operations.

In various examples, the ML model 1008 may be trained to output a binary classification (e.g., vehicle-caused or non-vehicle-caused) or may be trained to output a non-binary classification and/or additional information, such as a probability distribution over multiple possible collision causes or types. This may allow for more nuanced decision-making by the triage manager 314. Additionally, the thresholds used in operation 1014 may be dynamically adjusted based on factors such as the overall distribution of collision types in recent simulations, feedback from human analysts reviewing the triage results, and the like. Thus, the techniques described in processes 900 and 1000 may, individually and in combination, provide efficient and automated ways to classify causes of collisions in simulated driving scenarios, potentially reducing the need for manual review of some or all false positive collision events. Additionally, although FIGS. 8-10 describe techniques for analyzing and/or triaging simulated collisions within simulation driving scenarios, similar or identical techniques can be used for analyzing and/or triaging various other types of events within real-world or simulated scenarios. For instance, in various examples, the techniques herein can be used to triage a set of driving scenarios (e.g., real and/or simulated scenarios) for further analysis and/or classification, based on determining a set of scenarios including events of interest such as near-miss collisions, hard braking events by the vehicle, other undesirable low-frequency driving events, instances of a high-risk driving behavior, or anomalous occurrences within the scenario as a whole.

Figure 11:
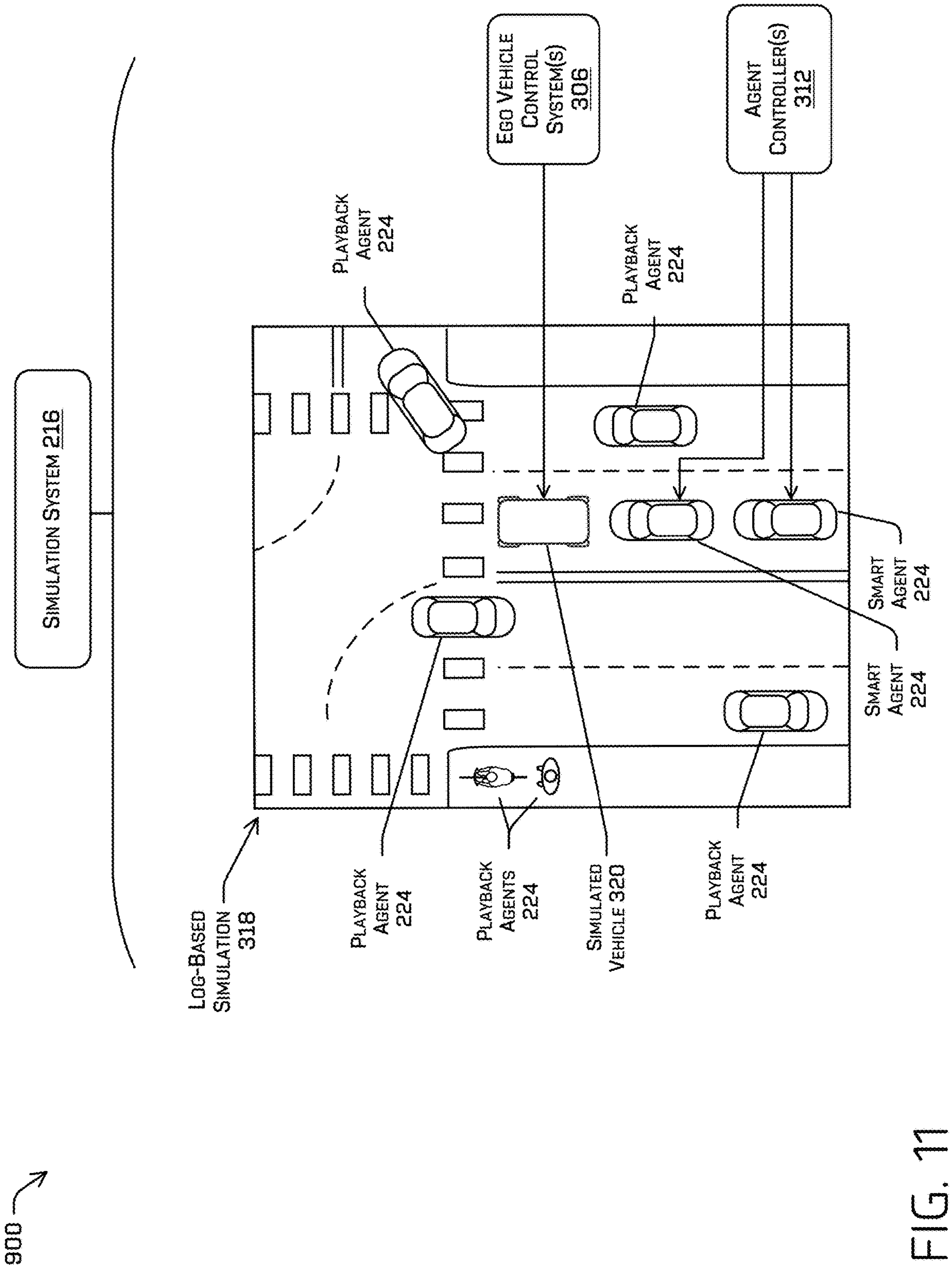
FIG. 11 depicts an example driving simulation including a combination of playback agents controlled based on the log data and smart agents controlled using agent controller(s), in accordance with one or more examples of the disclosure.

Referring to FIG. 11, an example system 1100 is shown including a simulation system 216 configured to perform log-based driving simulations to determine and validate the driving behaviors of simulated vehicles in a simulated driving environment. In this example, a log-based simulation 1102 is depicted including a simulated vehicle 1104, two smart agents 1106 and 1108, and a number of additional playback agents 1110-1118. As described herein, during the log-based simulation, the simulation system 216 may be configured to control the simulated vehicle 1104 using ego vehicle control system(s) 306 (e.g., the autonomous vehicle components to be validated by the simulation). The simulation system 216 may use agent controller(s) 312 to control the smart agents 1106 and 1108, and may control the playback agents 1110-1118 using the log data on which the simulation is based (e.g., to follow pre-determined trajectories corresponding to the trajectories of their respective objects in the log data).

The agent controller(s) 312, described in more detail below, may be configured to control smart agents dynamically, unlike playback agents, using any combination of heuristic-based algorithms and/or ML models to mimic realistic driving behaviors for the smart agents. As described below, the agent controller(s) 312 control the behaviors of their smart agents in a realistic manner based on the simulated environment, potentially incorporating factors such as right-of-way rules, headlock negotiation processes, and performing realistic human-like driving behaviors. This may allow the smart agents 1106 and 1108 to represent real-world objects more accurately, thereby providing improved realistic driving scenarios to allow the simulation system 216 to more effectively validate the ego vehicle control system(s) 306 being used to control the simulated vehicle 1104.

At the time shown in this example, the simulation 1102 includes a combination of playback agents and smart agents. As described above, the simulation system 216 may use a process to determine if and when playback agents should be converted to smart agents. This process may involve analyzing the trajectories of playback agents, detecting potential interactions between a playback agent and a different agent (e.g., the simulated vehicle 1104 or a smart agent), and performing a smart agent conversion when necessary to avoid a collision or other undesirable simulation outcome. In some examples, the simulation system 216 may commence a log-based simulation 1102 will all playback agents and no smart agents. However, different driving behaviors of the simulated vehicle 1104 relative to the behavior of the corresponding vehicle in the log data may cause the simulation system 216 to convert a first playback agent to a smart agent 1106 (e.g., to avoid a rear-end collision with the simulated vehicle 1104). Subsequently, at a later time point in the simulation, different behaviors of the smart agent 1106 relative to the corresponding playback agent in the log data may cause the simulation system 216 to convert a second playback agent to a smart agent 1108 (e.g., to avoid a rear-end collision with the smart agent 1106). As this example illustrates, the simulation system 216 may perform additional and/or cascading sets of conversions of playback agents to smart agents as the simulation 1102 continues. This gradual conversion of playback agents to smart agents may allow the simulation system 216 to maintain the overall structure and context of the original log-based scenario, while also providing flexibility to explore and evaluate the new behaviors of the simulated vehicle 320. This approach may help in creating more robust and realistic simulations for testing and validating autonomous vehicle control systems.

Figure 12:
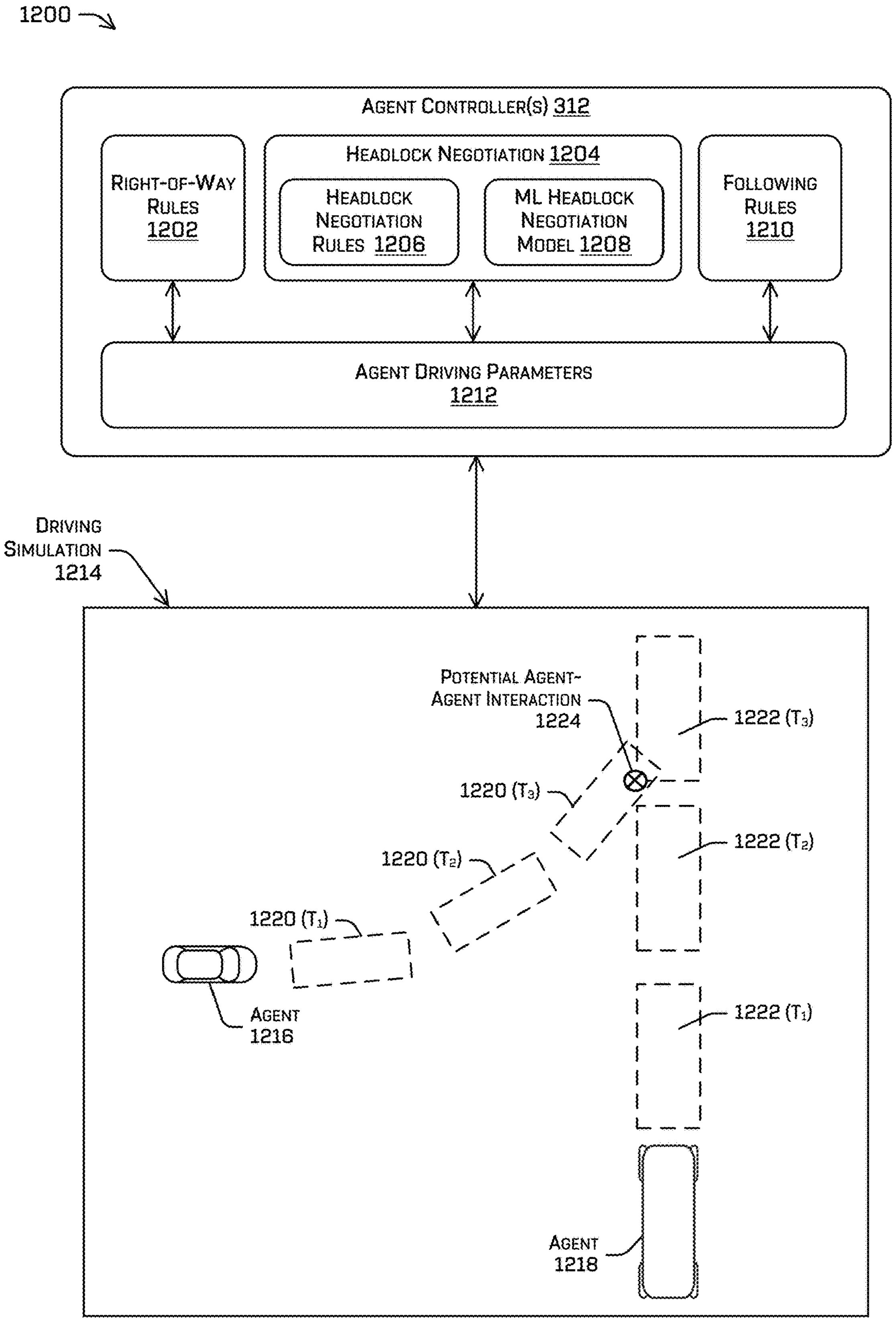
FIG. 12 illustrates an agent controller component of a simulation system configured to detect and avoid a potential interaction between agents in a driving simulation, in accordance with one or more examples of the disclosure.

Referring to FIG. 12, an example system 1200 is shown including agent controller(s) 312 configured to control smart agents during driving simulations. As described above, a simulation system 216 may include an interaction detector 308 configured to detect and analyze potential interactions involving one or more agents in driving simulation. In this example, in response to detecting a potential agent interaction involving one or more smart agents, the simulation system 216 may use agent controller(s) 312 to control the smart agent(s) in the simulation to respond to and/or avoid the potential interaction in a realistic and effective manner.

This example depicts a driving simulation 1214 showing a potential interaction (e.g., potential collision) between a first agent 1216 and a second agent 1218 in the driving simulation 1214. Trajectories 1220 and 1222 are respectively associated with agents 1216 and 1218, and may depict the future positions of the agents (e.g., including a safety buffer) at a sequence of future time points. In this example, trajectory 1220 and trajectory 1222 are each represented by a series of bounding boxes labeled T1 through T3, indicating the predicted positions of the first agent 1216 and the second agent 1218 at different time steps along their respective trajectories. As shown in this example, an analysis of the trajectories 1220 and 1222 (e.g., performed by an interaction detector 308) may determine a potential agent-agent interaction 1224, representing the point at which the first agent 1216 and second agent 1218 are predicted to occupy the same space at the same future time in the driving simulation. In some examples, the potential agent-agent interaction 1224 may be referred to as a potential collision point.

Based on detecting the agent-agent interaction 1224, the simulation system 216 may use a combination of processes and/or components of the agent controller(s) 312 to analyze the potential interaction to determine a responsive action to be performed by the first agent 1216 and/or the second agent 1218. In some examples, the agent controller(s) 312 may include a right-of-way component 1202 that can be configured to apply right-of-way rules to determine right-of-way states and/or sub-states for the first agent 1216 (e.g., a smart agent) and the second agent 1218 (which may be the simulated vehicle, a playback agent, or another smart agent) having a trajectory overlap with the first (smart) agent 1216. Based on the respective right-of-way states/sub-states of the first agent 1216 and the second agent 1218, the agent controller(s) 312 may set particular agent driving parameters 1212 to control the driving behavior of the first agent 1216 and/or the second agent 1218. Such behaviors, in response to a right-of-way determination, may include asserting priority or yielding in a realistic manner to comply with expected right-of-way behaviors.

Additionally, in some examples, the agent controller(s) 312 may include one or more headlock negotiation components 1204 configured to resolve a headlock situation between the first agent 1216 and the second agent 1218. Various headlock negotiation techniques, described in more detail below, may be used to determine smart agent behavior when a potential interaction between agents cannot be resolved with right-of-way rules and/or the rules of the road. In such examples, the agent controller(s) 312 may apply one or more of heuristic-based headlock negotiation rules component 1206 and/or an ML headlock negotiation model 1208 to determine whether the first agent 1216 or second agent 1218 should assert priority and proceed to resolve the headlock situation, or yield and allow the other agent to assert priority to proceed first. As described below, the headlock negotiation rules component 1206 may use the current state data of the agent and/or trajectories relative to the potential agent-agent interaction 1224. In other cases, an ML headlock negotiation model 1208 may be trained based on real-world headlock negotiation scenarios, to determine in a realistic manner which agents should assert priority and which agents should yield in headlock negotiations. Based on the determinations of the headlock negotiation components 1204, the agent controller(s) 312 may be configured to set particular agent driving parameters 1212 that will control the driving behaviors of the first agent 1216 and/or the second agent 1218. Such behaviors, in response to a headlock negation priority or yield determination, may include either asserting priority by continuing forward (or acceleration), or yielding to allow the other to proceed.

Additionally or alternatively, the agent controller(s) 312 may implement following rules 1210 that can be used, when a potential agent-agent interaction is detected, to determine whether the first agent 1216 and second agent 1218 are crossing paths, following one another, or merging into the same road/lane. For example, the agent controller(s) 312 may determine whether that a first agent is following a second agent based on a determination that the trajectory of the first agent overlaps the current location of the second agent, and that the trajectories of the first and second agent subsequently overlap at a future time point. Based on the determinations of the following rules 1210, the agent controller(s) 312 may be configured to set particular agent driving parameters 1212 that will control the driving behaviors of the first agent 1216 and/or the second agent 1218. For instance, a smart agent following another agent may maintain a particular speed and/or headway distance with respect to the leading agent, while a smart agent crossing paths with another agent may use different speed and/or headway distance parameters. As another example, a smart agent crossing paths with another agent may use a particular lateral avoidance parameter with respect to the crossing agent, while a smart agent intending to follow or merge with another vehicle/agent may not apply a lateral avoidance parameter (or may apply a different parameter). Additionally, a determination based on the following rules 1210 indicating that a playback agent is following the simulated vehicle and/or a smart agent may be used to determine whether the simulation system 216 should convert the playback agent to a smart agent.

Figure 13:
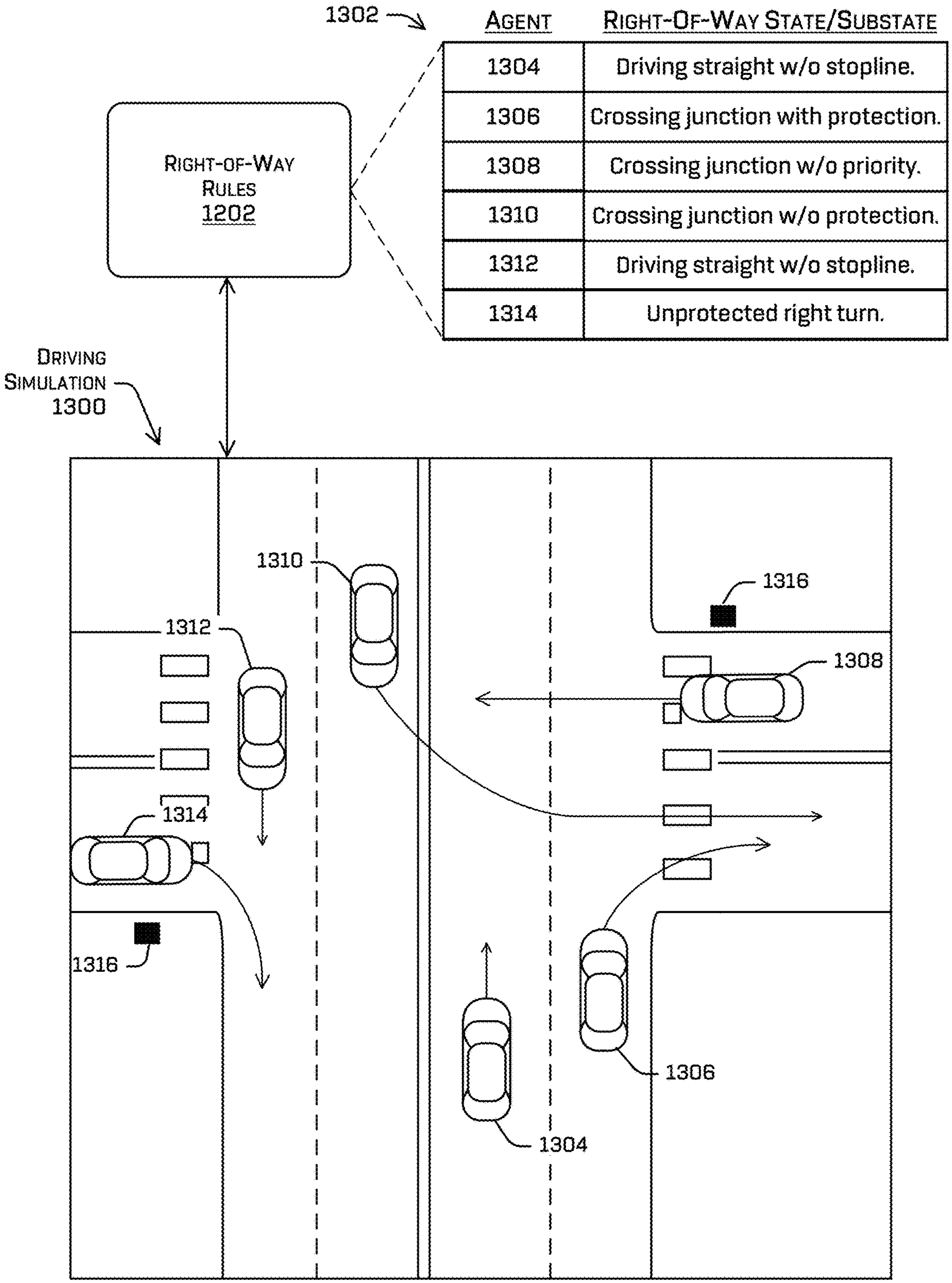
FIG. 13 illustrates a right-of-way component of an agent controller configured to determine right-of-way states of agents in a driving simulation, and to determine smart agent driving parameters based on the right-of-way states, in accordance with one or more examples of the disclosure.

Referring to FIG. 13, an example system is shown including a right-of-way component 1202 configured to apply a set of right-of-way rules to determine right-of-way states and/or sub-states associated with various agents in a driving simulation. As shown in this example, the right-of-way component 1202 has analyzed the agent trajectories within the driving simulation 1300, along with the road/lane data, traffic signal data, etc., to determine the right-of-way states 1302 for each of the agents in the driving simulation 1300.

In the driving simulation 1300, agent 1304 and agent 1312 have a right-of-way state corresponding to driving straight on a roadway without a stop line (e.g., stop sign, traffic light, etc.) which may correspond to the highest priority right-of-way state. Agent 1306 has a right-of-way state corresponding to crossing a junction with protection (e.g., has already stopped at a stop sign, has a green turn arrow, is proceeding straight with a green light, etc.) which may correspond to the second highest priority right-of-way state. A third highest priority right-of-way state may correspond to crossing a junction with priority (e.g., the agent has right-of way but is sharing the road with another agent, performing a right turn with a circular green light, etc.). Agent 1310 has a right-of-way state corresponding to crossing a junction without protection (e.g., performing an unprotected left turn) which may correspond to the fourth highest priority right-of-way state. Agent 1308 and agent 1314 have a right-of-way state corresponding to crossing a junction without priority (e.g., performing an unprotected right turn) which may correspond to the fifth highest priority right-of-way state.

In some implementations, in addition to determining right-of-way states for the agent in a driving simulation 1300, the right-of-way component 1202 also may determine one or more sub-states which may be used to assign a higher or lower priority to an agent when two agents have the same right-of-way state. As an example, the right-of-way component 1202 may determine a first right-of-way sub-state corresponding to the agent classification (e.g., in which pedestrians have higher priority than bicycles, which have higher priority than motorized vehicles, etc.). As another example, the right-of-way component 1202 may determine a lower priority sub-state when the agent is in the process of changing lanes within the same road.

Figure 14:
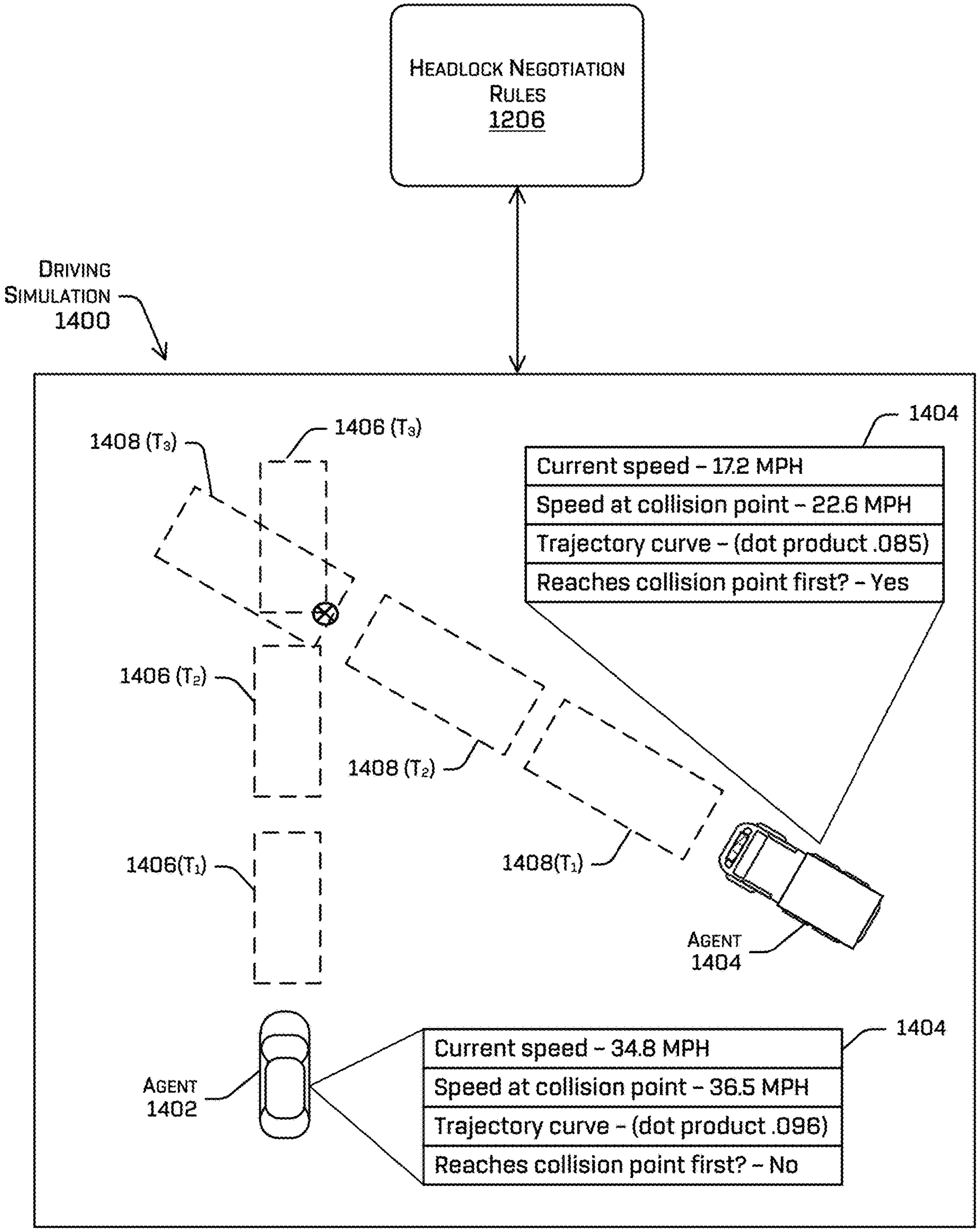
FIG. 14 illustrates a headlock negotiation rules component of an agent controller configured to analyze a potential interaction in a driving simulation, and to determine smart agent driving parameters based on the headlock negotiation rules, in accordance with one or more examples of the disclosure.

Referring to FIG. 14, an example system is shown including a headlock negotiation rules component 1206 configured to apply a set of headlock negotiation rules to determine which agent has priority in an agent-agent interaction during a driving simulation 1400. This example depicts another driving simulation 1400 showing a potential interaction (e.g., potential collision) between a first agent 1402 and a second agent 1404. Trajectories 1406 and 1408 are respectively associated with agents 1402 and 1404 and may depict the future positions of the agents (e.g., including a safety buffer) at a sequence of future time points. In this example, trajectory 1406 and trajectory 1408 are each represented by a series of bounding boxes labeled T1 through T3, indicating the predicted positions of the first agent 1402 and the second agent 1404 at different time steps along their respective trajectories. As shown in this example, an analysis of the trajectories 1406 and 1408 (e.g., performed by an interaction detector 308) may determine a potential interaction (e.g., potential collision) between the agents at approximately time T3.

In some examples, headlock negotiation rules and/or a headlock negotiation ML model 1208 may be applied in instances when the rules of the road and the right-of-way component 1202 cannot determine which agent should be the priority agent and which agent should be the non-priority agent in a potential interaction.

As shown in this example, when the headlock negotiation rules component 1206 is used to determine the priority and non-priority agent in a headlock situation, it may analyze the driving paths of both agents between their current positions and the potential collision point, and apply rules based on the driving paths to resolve the headlock situation. In some examples, the rules applied by the headlock negotiation rules component 1206 may be based on four factors (which may be applied and/or weighted in any combination to emphasize particular factors over others), including the current speed of the agent, the predicted speed of the agent at the collision point, the amount of trajectory curve within the agent's driving path, and whether the agent will reach the collision point first. In some examples, the amount of trajectory curve associated with an agent's driving path may be defined as the dot product between the current velocity vector of the agent and the velocity vector of the agent at the point of the interaction/collision.

The headlock negotiation rules component 1206 may evaluate each of these factors for an agent, relative to the counterpart agent in the potential interaction, using various criteria. For instance, speed comparisons may consider both absolute and relative differences, with thresholds for both current speed and projected speed at the collision point. Trajectory straightness may be assessed by comparing velocity vectors at different points, while the relative position at collision may be determined by analyzing the vectors between the agents' positions and velocities. Such approaches may allow for nuanced decision-making in complex traffic scenarios, potentially improving the realism of agent interactions in the simulation.

In some implementations, the headlock negotiation rules component 1206 may implement a scoring mechanism based on the above factors to resolve headlock situations between the agents. The scoring mechanism may calculate a score for each agent involved in a potential headlock, by comparing each of the above factors (e.g., speed at the time of collision, current speed, trajectory straightness, and relative position at the collision point) for the agents. For each factor that is won by a particular agent (an ego agent), the ego agent's score may be incremented, while for each factor won by the other agent, the ego agent's score may be decremented. The agent having a positive score may be determined to win the headlock negotiation. As described above, based on the determinations of the headlock negotiation rules components 1206, the agent controller(s) 312 may be configured to set particular agent driving parameters 1212 that will control the driving behaviors of the first agent 1402 and/or the second agent 1404 so that one or both agents will respond to the potential interaction in a safe and realistic manner. For instance, if the headlock negotiation rules components 1206 determines agent 1402 to have won the headlock negotiation, a driving parameter may be set for agent 1402 to proceed and assert priority while approaching the potential collision point, and a different driving parameter may be set for agent 1404 causing it to slow and yield to agent 1402 relative to the potential collision point.

In some examples, the simulation system 216 may use a separate agent controller 312 (e.g., a separate controller process or thread) to independently control each of the smart agents within a driving simulation. In such examples, the separate agent controllers 312 may be configured in some cases to operate identically, or in other cases may be configured differently to mimic different driving characteristics and/or styles (e.g., different smart agents having driving attributes, attentiveness levels, aggressive levels, reaction times, etc.). Thus, in situations when a first agent controller 312 determines, for a first agent interaction, whether the particular agent is a priority agent or a non-priority agent, a separate agent controller 312 may perform a corresponding determination for a second agent (and/or multiple other agent(s)) interacting with the first agent in the driving scenario. It is possible in such implementations that both agent controllers 312 may determine that their agent is the priority agent and may set parameters to control their respective agents so that both/all of them will assert priority (e.g., proceed first and assume the other agent will yield). Similarly, it is possible when multiple agent controllers 312 are used that both/all of the agent controllers 312 will determine that their agent is the non-priority agent and will set parameters to control their respective agents to yield and assume that the other agent proceed first in the interaction/headlock situation. These examples provide additional valuable simulations by modeling real-world behaviors when multiple agents assert and/or yield right-of-way, including individual agents or pairs of interacting agents changing/toggling back and forth between priority and non-priority determinations as the scenario progresses (e.g., taking into account observations of the other agent and reaction time).

EXAMPLE CLAUSES

A-1. A system comprising: one or more processors; and one or more non-transitory computer-readable media storing computer-executable instructions that, when executed, cause the one or more processors to perform operations comprising: receiving log data representing a driving scenario at a first time point, wherein the log data includes a first trajectory associated with a first object and a second trajectory associated with a second object; determining, based at least in part on the first trajectory and second trajectory, a spatial overlap between the first object and the second object for a second time point after the first time point in the driving scenario; determining, based at least in part on the spatial overlap, an interaction between the first object and the second object in the driving scenario; determining, based at least in part on the log data, interaction data characterizing the interaction between the first object and the second object; generating a scenario encoding representative of the driving scenario, wherein the scenario encoding includes the interaction data; and determining a second driving scenario based on the scenario encoding, by performing at least one of: searching a scenario encoding data store, using the scenario encoding, to determine the second driving scenario as a similar scenario to the driving scenario; or generating the second driving scenario using a machine-learned generative model, based on the interaction data.

A-2. The system of paragraph A-1, wherein the interaction data comprises at least one of: a distance, at a first time in the log data, between the first object and the second object; a relative speed, at the first time, between the first object and the second object; a first classification of the first object; a distance, at the first time, between the first object and an interaction point where the first trajectory and the second trajectory overlap; and a second time when the first object will reach the interaction point.

A-3. The system of paragraph A-1, the operations further comprising: determining, based at least in part on the second trajectory and a third trajectory associated with a third object, a second interaction between the second object and the third object in the driving scenario; and determining, based at least in part on the log data, second interaction data characterizing the second interaction, wherein the scenario encoding includes the second interaction data.

A-4. The system of paragraph A-1, wherein the scenario encoding representative of the driving scenario is further based on: map data characterizing a road configuration of the log data; agent data characterizing the first object and the second object; and trajectory data characterizing the first trajectory and the second trajectory.

A-5. The system of paragraph A-1, wherein the interaction data is associated with a first time in the driving scenario, the operations further comprising: determining, based at least in part on the first trajectory and the second trajectory, second interaction data characterizing the interaction between the first object and the second object for a second time in the driving scenario, wherein the scenario encoding includes the second interaction data.

A-6. A method comprising: receiving log data representing a driving scenario, wherein the log data includes a first trajectory associated with a first object and a second trajectory associated with a second object; determining, based at least in part on the first trajectory and second trajectory, an interaction between the first object and the second object in the driving scenario; determining, based at least in part on the log data, interaction data characterizing the interaction between the first object and the second object; generating a scenario encoding representative of the driving scenario, wherein the scenario encoding includes the interaction data; and determining a second driving scenario based on the scenario encoding.

A-7. The method of paragraph A-6, wherein the interaction data comprises at least one of: a distance, at a first time in the log data, between the first object and the second object; a relative speed, at the first time, between the first object and the second object; a first classification of the first object; a distance, at the first time, between the first object and an interaction point where the first trajectory and the second trajectory overlap; and a second time when the first object will reach the interaction point.

A-8. The method of paragraph A-6, further comprising: determining, based at least in part on the second trajectory and a third trajectory associated with a third object, a second interaction between the second object and the third object in the driving scenario; and determining, based at least in part on the log data, second interaction data characterizing the second interaction, wherein the scenario encoding includes the second interaction data.

A-9. The method of paragraph A-8, further comprising: determining a fourth trajectory associated with a fourth object in the driving scenario, wherein: the fourth trajectory does not overlap with the first trajectory, second trajectory, or third trajectory; and the scenario encoding representative of the driving scenario excludes an interaction based on the fourth trajectory.

A-10. The method of paragraph A-6, wherein the scenario encoding representative of the driving scenario is further based on: map data characterizing a road configuration of the log data; agent data characterizing the first object and the second object; and trajectory data characterizing the first trajectory and the second trajectory.

A-11. The method of paragraph A-10, wherein determining the second driving scenario comprises: retrieving, from a scenario encoding data store, a second scenario encoding associated with the second driving scenario, based at least in part on: an interaction weight associated with the interaction data; a map data weight associated with the map data; an agent weight associated with the agent data; and a trajectory weight associated with the trajectory data.

A-12. The method of paragraph A-6, wherein the interaction data is associated with a first time in the driving scenario, the method further comprising: determining, based at least in part on the first trajectory and the second trajectory, second interaction data characterizing the interaction between the first object and the second object for a second time in the driving scenario, wherein the scenario encoding includes the second interaction data.

A-13. The method of paragraph A-6, wherein determining the second driving scenario comprises at least one of: retrieving, from a scenario encoding data store, a second scenario encoding associated with the second driving scenario, based at least in part on similarity calculation based on the scenario encoding and the second scenario encoding; or generating, using a machine-learned generative model, the second driving scenario based on the interaction data.

A-14. One or more non transitory computer readable media storing instructions executable by a processor, wherein the instructions, when executed, cause the processor to perform operations comprising: receiving log data representing a driving scenario, wherein the log data includes a first trajectory associated with a first object and a second trajectory associated with a second object; determining, based at least in part on the first trajectory and second trajectory, an interaction between the first object and the second object in the driving scenario; determining, based at least in part on the log data, interaction data characterizing the interaction between the first object and the second object; generating a scenario encoding representative of the driving scenario, wherein the scenario encoding includes the interaction data; and determining a second driving scenario based on the scenario encoding.

A-15. The one or more non transitory computer readable media of paragraph A-14, wherein the interaction data comprises at least one of: a distance, at a first time in the log data, between the first object and the second object; a relative speed, at the first time, between the first object and the second object; a first classification of the first object; a distance, at the first time, between the first object and an interaction point where the first trajectory and the second trajectory overlap; and a second time when the first object will reach the interaction point.

A-16. The one or more non transitory computer readable media of paragraph A-14, the operations further comprising: determining, based at least in part on the second trajectory and a third trajectory associated with a third object, a second interaction between the second object and the third object in the driving scenario; and determining, based at least in part on the log data, second interaction data characterizing the second interaction, wherein the scenario encoding includes the second interaction data.

A-17. The one or more non transitory computer readable media of paragraph A-16, the operations further comprising: determining a fourth trajectory associated with a fourth object in the driving scenario, wherein: the fourth trajectory does not overlap with the first trajectory, second trajectory, or third trajectory; and the scenario encoding representative of the driving scenario excludes an interaction based on the fourth trajectory.

A-18. The one or more non transitory computer readable media of paragraph A-14, wherein the scenario encoding representative of the driving scenario is further based on: map data characterizing a road configuration of the log data; agent data characterizing the first object and the second object; and trajectory data characterizing the first trajectory and the second trajectory.

A-19. The one or more non transitory computer readable media of paragraph A-18, wherein determining the second driving scenario comprises: retrieving, from a scenario encoding data store, a second scenario encoding associated with the second driving scenario, based at least in part on: an interaction weight associated with the interaction data; a map data weight associated with the map data; an agent weight associated with the agent data; and a trajectory weight associated with the trajectory data.

A-20. The one or more non transitory computer readable media of paragraph A-14, wherein the interaction data is associated with a first time in the driving scenario, the operations further comprising: determining, based at least in part on the first trajectory and the second trajectory, second interaction data characterizing the interaction between the first object and the second object for a second time in the driving scenario, wherein the scenario encoding includes the second interaction data.

B-1. A system comprising: one or more processors; and one or more non-transitory computer-readable media storing computer-executable instructions that, when executed, cause the one or more processors to perform operations comprising: receiving a simulated driving scenario, wherein the simulated driving scenario includes a simulated collision between a simulated vehicle and a simulated agent within the simulated driving scenario; determining a second driving scenario, wherein the second driving scenario includes a second collision involving a second vehicle; determining, based at least in part on the simulated driving scenario and the second driving scenario, a scenario similarity value; based at least in part on the scenario similarity value, executing a machine-learned classifier model trained to determine a type of the simulated collision; determining, based on the type of the simulated collision, a triage destination for the simulated driving scenario; and transmitting the simulated driving scenario to the triage destination.

B-2. The system of paragraph B-1, wherein determining the scenario similarity value comprises: determining, using a scenario encoder model, a scenario encoding associated with the simulated driving scenario; and determining a distance in a scenario encoding vector space, between the scenario encoding and a second scenario encoding associated with the second driving scenario.

B-3. The system of paragraph B-1, wherein determining the second driving scenario comprises: determining, using a scenario encoder model, a scenario encoding associated with the simulated driving scenario; comparing the scenario encoding to a plurality of scenario encodings in a scenario encoding vector space, wherein each of the plurality of scenario encodings is associated with a training scenario used to train the machine-learned classifier model; determining a closest scenario encoding, of the plurality of scenario encodings, to the scenario encoding associated with the simulated driving scenario; and determining, as the second driving scenario, a driving scenario associated with the closest scenario encoding.

B-4. The system of paragraph B-1, the operations further comprising: receiving a third simulated driving scenario, wherein the third simulated driving scenario includes a third simulated collision; determining a fourth driving scenario, wherein the fourth driving scenario includes a fourth collision involving a fourth vehicle; determining a second similarity value between the third simulated driving scenario and the fourth driving scenario; and transmitting the third simulated driving scenario to the triage destination, based on determining that the second similarity value is less than a similarity threshold.

B-5. The system of paragraph B-4, wherein the third simulated driving scenario is transmitted to the triage destination without executing the machine-learned classifier model to classify the third simulated driving scenario.

B-6. A method comprising: receiving a driving scenario including a vehicle, wherein the driving scenario includes an event associated with the vehicle; determining a second driving scenario, wherein the second driving scenario includes a second event associated with a second vehicle; determining, based at least in part on the driving scenario and the second driving scenario, a scenario similarity value; based at least in part on the scenario similarity value, executing a machine-learned classifier model trained to determine a type of the event in the driving scenario; determining, based on the type of the event, a triage destination for the driving scenario; and transmitting the driving scenario to the triage destination.

B-7. The method of paragraph B-6, wherein the machine-learned classifier model comprises: a scenario encoder model configured to receive the driving scenario as input and to output a scenario encoding; and a separate neural network associated with the scenario encoder model configured to receive as input the scenario encoding and to output the type of the event in the driving scenario.

B-8. The method of paragraph B-6, wherein determining the scenario similarity value comprises: determining, using a scenario encoder model, a scenario encoding associated with the driving scenario; and determining a distance in a scenario encoding vector space, between the scenario encoding and a second scenario encoding associated with the second driving scenario.

B-9. The method of paragraph B-6, wherein determining the second driving scenario comprises: determining, using a scenario encoder model, a scenario encoding associated with the driving scenario; comparing the scenario encoding to a plurality of scenario encodings in a scenario encoding vector space, wherein each of the plurality of scenario encodings is associated with a training scenario used to train the machine-learned classifier model; determining a closest scenario encoding, of the plurality of scenario encodings, to the scenario encoding associated with the driving scenario; and determining, as the second driving scenario, a driving scenario associated with the closest scenario encoding.

B-10. The method of paragraph B-6, further comprising: receiving a third driving scenario, wherein the third driving scenario includes a third event; determining a fourth driving scenario, wherein the fourth driving scenario includes a fourth event involving a fourth vehicle; determining a second similarity value between the third driving scenario and the fourth driving scenario; and transmitting the third driving scenario to the triage destination, based on determining that the second similarity value is less than a similarity threshold.

B-11. The method of paragraph B-10, wherein the third driving scenario is transmitted to the triage destination without executing the machine-learned classifier model to classify the third driving scenario.

B-12. The method of paragraph B-6, further comprising: determining, using a second heuristic-based classifier model, a preliminary event type of the event, wherein determining the scenario similarity value for the event is based on the preliminary event type.

B-13. The method of paragraph B-6, wherein determining the triage destination comprises: determining, based on an output of the machine-learned classifier model, a confidence value associated with the type of the event; and determining the triage destination, from a plurality of triage destinations, based at least in part on the confidence value.

B-14. One or more non transitory computer readable media storing instructions executable by a processor, wherein the instructions, when executed, cause the processor to perform operations comprising: receiving a driving scenario including a vehicle, wherein the driving scenario includes an event associated with the vehicle; determining a second driving scenario, wherein the second driving scenario includes a second event associated with a second vehicle; determining, based at least in part on the driving scenario and the second driving scenario, a scenario similarity value; based at least in part on the scenario similarity value, executing a machine-learned classifier model trained to determine a type of the event in the driving scenario; determining, based on the type of the event, a triage destination for the driving scenario; and transmitting the driving scenario to the triage destination.

B-15. The one or more non transitory computer readable media of paragraph B-14, wherein the machine-learned classifier model comprises: a scenario encoder model configured to receive the driving scenario as input and to output a scenario encoding; and a separate neural network associated with the scenario encoder model configured to receive as input the scenario encoding and to output the type of the event in the driving scenario.

B-16. The one or more non transitory computer readable media of paragraph B-14, wherein determining the scenario similarity value comprises: determining, using a scenario encoder model, a scenario encoding associated with the driving scenario; and determining a distance in a scenario encoding vector space, between the scenario encoding and a second scenario encoding associated with the second driving scenario.

B-17. The one or more non transitory computer readable media of paragraph B-14, wherein determining the second driving scenario comprises: determining, using a scenario encoder model, a scenario encoding associated with the driving scenario; comparing the scenario encoding to a plurality of scenario encodings in a scenario encoding vector space, wherein each of the plurality of scenario encodings is associated with a training scenario used to train the machine-learned classifier model; determining a closest scenario encoding, of the plurality of scenario encodings, to the scenario encoding associated with the driving scenario; and determining, as the second driving scenario, a driving scenario associated with the closest scenario encoding.

B-18. The one or more non transitory computer readable media of paragraph B-14, the operations further comprising: receiving a third driving scenario, wherein the third driving scenario includes a third event; determining a fourth driving scenario, wherein the fourth driving scenario includes a fourth event involving a fourth vehicle; determining a second similarity value between the third driving scenario and the fourth driving scenario; and transmitting the third driving scenario to the triage destination, based on determining that the second similarity value is less than a similarity threshold.

B-19. The one or more non transitory computer readable media of paragraph B-18, wherein the third driving scenario is transmitted to the triage destination without executing the machine-learned classifier model to classify the third driving scenario.

B-20. The one or more non-transitory computer readable media of paragraph B-14, the operations further comprising: determining, using a second heuristic-based classifier model, a preliminary event type of the event, wherein determining the scenario similarity value for the event is based on the preliminary event type.

C-1. A system comprising: one or more processors; and a memory storing processor-executable instructions that, when executed by the one or more processors, cause the one or more processors to perform operations comprising: receiving sensor data associated with a vehicle traversing a driving environment; determining a vehicle trajectory associated with the vehicle; determining, based at least in part on the sensor data, an agent trajectory associated with an agent in the driving environment; determining, based at least in part on the vehicle trajectory and the agent trajectory, an interaction between the vehicle and the agent; determining interaction data characterizing the interaction between the vehicle and the agent; determining, based at least in part on the interaction data, the vehicle as being either a priority vehicle or a non-priority vehicle with respect to the agent; and controlling the vehicle within the driving environment, wherein controlling the vehicle comprises determining a first parameter for controlling the vehicle, based on the vehicle being either the priority vehicle or the non-priority vehicle.

C-2. The system of paragraph C-1, the operations further comprising: determining, based at least in part on map data associated with the driving environment: a first right-of-way state associated with the vehicle; and a second right-of-way state associated with the agent; and determining the vehicle as either the priority vehicle or the non-priority vehicle, based at least in part on the first right-of-way state and the second right-of-way state.

C-3. The system of paragraph C-2, wherein determining the second right-of-way state associated with the agent comprises at least one of: determining that the agent is proceeding on a first road without a stop line; determining that the agent is crossing a junction from a protected lane; determining that the agent is crossing a junction from a priority lane; determining that the agent is crossing a junction from a non-protected lane; or determining that the agent is crossing a junction from a non-protected and non-priority lane.

C-4. The system of paragraph C-2, the operations further comprising: based on determining that the vehicle and the agent are associated with a same right-of-way state, executing at least one of: a machine-learned model trained to determine the vehicle as either the priority vehicle or the non-priority vehicle; or a set of heuristics configured to determine the vehicle as either the priority vehicle or the non-priority vehicle.

C-5. The system of paragraph C-1, wherein determining the vehicle as either the priority vehicle or the non-priority vehicle comprises: executing a machine-learned model trained to receive a driving scenario including a first object having a first trajectory and a second object having a second trajectory overlapping the first trajectory, wherein the machine-learned model is trained based on non-simulated driving scenario data.

C-6. The system of paragraph C-1, wherein determining the vehicle as either the priority vehicle or the non-priority vehicle comprises: determining an intersection point where the vehicle trajectory overlaps the agent trajectory; and executing a set of heuristics configured to determine the vehicle as either the priority vehicle or the non-priority vehicle, based on at least one of: a current speed of the vehicle at a current point on the vehicle trajectory; a future predicted speed of the vehicle at the intersection point; a route curvature of the vehicle between the current point and the intersection point; or a time that the vehicle will reach the intersection point relative to the agent.

C-7. A method comprising: executing a driving simulation including a first simulated agent having a first trajectory and a second simulated agent having a second trajectory; determining, based at least in part on the first trajectory and the second trajectory, an interaction between the first simulated agent and the second simulated agent; determining interaction data characterizing the interaction between the first simulated agent and the second simulated agent; determining, using an agent controller and based at least in part on the interaction data, the first simulated agent as being either a priority agent or a non-priority agent with respect to the second simulated agent; determining an agent control parameter for the first simulated agent, based on the determination of the first simulated agent as the priority agent or the non-priority agent; and controlling the first simulated agent during the driving simulation using the agent control parameter.

C-8. The method of paragraph C-7, further comprising: determining, based at least in part on map data associated with the driving simulation: a first right-of-way state associated with the first simulated agent; and a second right-of-way state associated with the second simulated agent; and determining the first simulated agent as the priority agent, based at least in part on the first right-of-way state and the second right-of-way state.

C-9. The method of paragraph C-8, wherein determining the first right-of-way state associated with the first simulated agent comprises at least one of: determining that the first simulated agent is proceeding on a first road without a stop line; determining that the first simulated agent is crossing a junction from a protected lane; determining that the first simulated agent is crossing a junction from a priority lane; determining that the first simulated agent is crossing a junction from a non-protected lane; or determining that the first simulated agent is crossing a junction from a non-protected and non-priority lane.

C-10. The method of paragraph C-8, wherein determining the first right-of-way state associated with the first simulated agent comprises at least one of: determining a classification of the first simulated agent; or determining that the first simulated agent performing a lane change on a first road.

C-11. The method of paragraph C-8, further comprising: based on determining that the first simulated agent and the second simulated agent are associated with a same right-of-way state, executing at least one of: a machine-learned model trained to determine the priority agent; or a set of heuristics configured to determine the priority agent.

C-12. The method of paragraph C-7, further comprising determining the first simulated agent as the priority agent with respect to the second simulated agent, based at least in part on: executing a machine-learned model trained to receive a driving scenario including a first object having a first trajectory and a second object having a second trajectory overlapping the first trajectory, wherein the machine-learned model is trained based on non-simulated driving scenario data.

C-13. The method of paragraph C-7, further comprising determining the first simulated agent as the priority agent with respect to the second simulated agent, based at least in part on: determining an intersection point where a first trajectory of the first simulated agent overlaps a second trajectory of the second simulated agent; and executing a set of heuristics configured to determine the priority agent based on at least one of: a current speed of the first simulated agent at a current point in the driving simulation; a future speed of the first simulated agent at the intersection point; a route curvature of the first simulated agent between the current point and the intersection point; or a time that the first simulated agent will reach the intersection point relative to the second simulated agent.

C-14. The method of paragraph C-7, further comprising: determining, using a second agent controller and based at least in part on the interaction data, the second simulated agent as being either the priority agent or the non-priority agent with respect to the first simulated agent; determining a second agent control parameter for the second simulated agent, based on the determination of the second simulated agent as the priority agent or the non-priority agent; and controlling the second simulated agent during the driving simulation using the second agent control parameter.

C-15. One or more non transitory computer readable media storing instructions executable by a processor, wherein the instructions, when executed, cause the processor to perform operations comprising: executing a driving simulation including a first simulated agent having a first trajectory and a second simulated agent having a second trajectory; determining, based at least in part on the first trajectory and the second trajectory, an interaction between the first simulated agent and the second simulated agent; determining interaction data characterizing the interaction between the first simulated agent and the second simulated agent; determining, using an agent controller and based at least in part on the interaction data, the first simulated agent as being either a priority agent or a non-priority agent with respect to the second simulated agent; determining an agent control parameter for the first simulated agent, based on the determination of the first simulated agent as the priority agent or the non-priority agent; and controlling the first simulated agent during the driving simulation using the agent control parameter.

C-16. The one or more non transitory computer readable media of paragraph C-15, the operations further comprising: determining, based at least in part on map data associated with the driving simulation: a first right-of-way state associated with the first simulated agent; and a second right-of-way state associated with the second simulated agent; and determining the first simulated agent as the priority agent, based at least in part on the first right-of-way state and the second right-of-way state.

C-17. The one or more non transitory computer readable media of paragraph C-16, wherein determining the first right-of-way state associated with the first simulated agent comprises at least one of: determining that the first simulated agent is proceeding on a first road without a stop line; determining that the first simulated agent is crossing a junction from a protected lane; determining that the first simulated agent is crossing a junction from a priority lane; determining that the first simulated agent is crossing a junction from a non-protected lane; or determining that the first simulated agent is crossing a junction from a non-protected and non-priority lane.

C-18. The one or more non transitory computer readable media of paragraph C-16, wherein determining the first right-of-way state associated with the first simulated agent comprises at least one of: determining a classification of the first simulated agent; or determining that the first simulated agent performing a lane change on a first road.

C-19. The one or more non transitory computer readable media of paragraph C-15, the operations further comprising determining the first simulated agent as the priority agent with respect to the second simulated agent, based at least in part on: determining an intersection point where a first trajectory of the first simulated agent overlaps a second trajectory of the second simulated agent; and executing a set of heuristics configured to determine the priority agent based on at least one of: a current speed of the first simulated agent at a current point in the driving simulation; a future speed of the first simulated agent at the intersection point; a route curvature of the first simulated agent between the current point and the intersection point; or a time that the first simulated agent will reach the intersection point relative to the second simulated agent.

C-20. The one or more non transitory computer readable media of paragraph C-15, the operations further comprising: determining, using a second agent controller and based at least in part on the interaction data, the second simulated agent as being either the priority agent or the non-priority agent with respect to the first simulated agent; determining a second agent control parameter for the second simulated agent, based on the determination of the second simulated agent as the priority agent or the non-priority agent; and controlling the second simulated agent during the driving simulation using the second agent control parameter.

D-1. A system comprising: one or more processors; and one or more non-transitory computer-readable media storing computer-executable instructions that, when executed, cause the one or more processors to perform operations comprising: receiving a representation of a simulated driving scenario associated with a first time point in a driving simulation, the representation including a first simulated agent with a first trajectory and a second simulated agent with a second trajectory; determining, based at least in part on the first trajectory and second trajectory, a spatial overlap between a first bounding box associated with the first simulated agent and a second bounding box associated with the second simulated agent, for a second time point after the first time point in the driving scenario; determining, based at least in part on the spatial overlap, an interaction between the first agent and the second agent; determining, based at least in part on the first trajectory and second trajectory, that the first agent is following the second agent; determining, based at least in part on determining that the first agent is following the second agent, a following control parameter associated with the first agent; and controlling the first agent during the driving simulation using the following control parameter.

D-2. The system of paragraph D-1, wherein determining that the first simulated agent is following the second simulated agent comprises: determining that the first trajectory of the first simulated agent overlaps a current position of the second simulated agent; and determining an overlap between the first trajectory and the second trajectory at a future time point in the driving scenario.

D-3. The system of paragraph D-1, wherein determining that the first simulated agent is following the second simulated agent comprises: a first predicted yaw of the first simulated agent at a time associated with the spatial overlap; and a second predicted yaw of the second simulated agent at the time associated with the spatial overlap.

D-4. The system of paragraph D-1, wherein the following control parameter comprises at least one of: a speed control parameter; a headway distance control parameter; and or a lateral avoidance control parameter.

D-5. The system of paragraph D-1, wherein: the first simulated agent is a playback agent in the driving simulation; and the controlling comprises converting the first simulated agent from a playback agent to a smart during the driving simulation.

D-6. A method comprising: receiving a representation of a driving scenario including a first agent with a first trajectory and a second agent with a second trajectory; determining, based at least in part on the first trajectory and second trajectory, an interaction between the first agent and the second agent; determining an interaction type of the interaction between the first agent and the second agent; determining, based at least in part on the interaction type, a control parameter associated with at least one of the first agent or the second agent; and controlling at least one of the first agent or the second agent using the control parameter.

D-7. The method of paragraph D-6, wherein determining the interaction type comprises determining, based on the first trajectory and second trajectory, at least one: the first agent and the second agent are crossing paths; the first agent is following the second agent; or the first agent is merging into a driving lane of the second agent.

D-8. The method of paragraph D-6, wherein determining the interaction type comprises determining that the first agent is following the second agent, based at least in part on: determining that the first trajectory of the first agent overlaps a current position of the second agent; and determining an overlap between the first trajectory and the second trajectory at a future time point in the driving scenario.

D-9. The method of paragraph D-6, wherein determining the interaction type comprises determining that the first agent is merging into a driving lane of the second agent, and wherein the method further comprises: determining, based at least in part on the first trajectory and the second trajectory, a state transition time for the first agent in the driving scenario; controlling the first agent for a first duration before the state transition time, using a using a first driving parameter associated with a crossing path driving maneuver; and controlling the first agent for a second duration after the state transition time, using a using a second driving parameter associated with a following driving maneuver.

D-10. The method of paragraph D-6, wherein determining the interaction between the first agent and the second agent comprises: determining, based at least in part on the first trajectory and second trajectory, a spatial overlap between a first predicted bounding box associated with the first agent and a second predicted bounding box associated with the second agent, for a future time point in the driving scenario, wherein determining the interaction type of the interaction is based at least in part on a first intended destination of the first agent extending beyond the spatial overlap, and a second intended destination of the first agent extending beyond the spatial overlap.

D-11. The method of paragraph D-6, wherein determining the interaction type is further based on: a first predicted yaw of the first agent at a time associated with the interaction; and a second predicted yaw of the second agent at the time associated with the interaction.

D-12. The method of paragraph D-6, wherein determining the interaction type comprises determining that the first agent is following the second agent, the method further comprising: controlling at least one of a speed control parameter, a headway distance control parameter, or a lateral avoidance control parameter of the first agent, based on determining that the first agent is following the second agent.

D-13. The method of paragraph D-6, wherein: the driving scenario is a driving simulation; the first agent is a playback agent in the driving simulation; and the controlling comprises converting the first agent from a playback agent to a smart during the driving simulation, based at least in part on the interaction type.

D-14. One or more non transitory computer readable media storing instructions executable by a processor, wherein the instructions, when executed, cause the processor to perform operations comprising: receiving a representation of a driving scenario including a first agent with a first trajectory and a second agent with a second trajectory; determining, based at least in part on the first trajectory and second trajectory, an interaction between the first agent and the second agent; determining an interaction type of the interaction between the first agent and the second agent; determining, based at least in part on the interaction type, a control parameter associated with at least one of the first agent or the second agent; and controlling at least one of the first agent or the second agent using the control parameter.

D-15. The one or more non transitory computer readable media of paragraph D-14, wherein determining the interaction type comprises determining, based on the first trajectory and second trajectory, at least one: the first agent and the second agent are crossing paths; the first agent is following the second agent; or the first agent is merging into a driving lane of the second agent.

D-16. The one or more non transitory computer readable media of paragraph D-14, wherein determining the interaction type comprises determining that the first agent is following the second agent, based at least in part on: determining that the first trajectory of the first agent overlaps a current position of the second agent; and determining an overlap between the first trajectory and the second trajectory at a future time point in the driving scenario.

D-17. The one or more non transitory computer readable media of paragraph D-14, wherein determining the interaction type comprises determining that the first agent is merging into a driving lane of the second agent, the operations further comprising: determining, based at least in part on the first trajectory and the second trajectory, a state transition time for the first agent in the driving scenario; controlling the first agent for a first duration before the state transition time, using a using a first driving parameter associated with a crossing path driving maneuver; and controlling the first agent for a second duration after the state transition time, using a using a second driving parameter associated with a following driving maneuver.

D-18. The one or more non transitory computer readable media of paragraph D-14, wherein determining the interaction between the first agent and the second agent comprises: determining, based at least in part on the first trajectory and second trajectory, a spatial overlap between a first predicted bounding box associated with the first agent and a second predicted bounding box associated with the second agent, for a future time point in the driving scenario, wherein determining the interaction type of the interaction is based at least in part on a first intended destination of the first agent extending beyond the spatial overlap, and a second intended destination of the first agent extending beyond the spatial overlap.

D-19. The one or more non transitory computer readable media of paragraph D-14, wherein determining the interaction type is further based on: a first predicted yaw of the first agent at a time associated with the interaction; and a second predicted yaw of the second agent at the time associated with the interaction.

D-20. The one or more non transitory computer readable media of paragraph D-14, wherein determining the interaction type comprises determining that the first agent is following the second agent, the operations further comprising: controlling at least one of a speed control parameter, a headway distance control parameter, or a lateral avoidance control parameter of the first agent, based on determining that the first agent is following the second agent.

While the example clauses described above are described with respect to particular implementations, it should be understood that, in the context of this document, the content of the example clauses can be implemented via a method, device, system, a computer-readable medium, and/or another implementation. Additionally, any of examples A-1 to D-20 may be implemented alone or in combination with any other one or more of the examples A-1 to D-20.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:

one or more processors; and a memory storing processor-executable instructions that, when executed by the one or more processors, cause the one or more processors to perform operations comprising:

receiving, by an autonomous vehicle, sensor data associated with a driving environment;

determining, by the autonomous vehicle, a vehicle trajectory associated with the autonomous vehicle;

determining, by the autonomous vehicle, based at least in part on the sensor data, an agent trajectory associated with an agent in the driving environment;

determining, by the autonomous vehicle, based at least in part on the vehicle trajectory and the agent trajectory, an interaction between the autonomous vehicle and the agent at an interaction point in the driving environment;

executing, by the autonomous vehicle, a set of heuristics to determine the autonomous vehicle as being either a priority vehicle or a non-priority vehicle with respect to the agent, wherein the set of heuristics is based on at least one of:

a future speed of the autonomous vehicle or the agent at the interaction point; or a route curvature of the autonomous vehicle or the agent between a current point and the interaction point; and controlling the autonomous vehicle within the driving environment, wherein controlling the autonomous vehicle comprises determining a first parameter for controlling the autonomous vehicle, based on the autonomous vehicle being either the priority vehicle or the non-priority vehicle.

2. The system of claim 1, the operations further comprising:

determining, based at least in part on map data associated with the driving environment:

a first right-of-way state associated with the autonomous vehicle; and a second right-of-way state associated with the agent; and determining the autonomous vehicle as either the priority vehicle or the non-priority vehicle, based at least in part on the first right-of-way state and the second right-of-way state.

3. The system of claim 2, wherein determining the second right-of-way state associated with the agent comprises at least one of:

determining that the agent is proceeding on a first road without a stop line;

determining that the agent is crossing a junction from a protected lane;

determining that the agent is crossing a junction from a priority lane;

determining that the agent is crossing a junction from a non-protected lane; or determining that the agent is crossing a junction from a non-protected and non-priority lane.

4. The system of claim 2, the operations further comprising:

based on determining that the autonomous vehicle and the agent are associated with a same right-of-way state, executing a machine-learned model trained to determine the autonomous vehicle as either the priority vehicle or the non-priority vehicle.

5. The system of claim 1, wherein determining the autonomous vehicle as either the priority vehicle or the non-priority vehicle comprises:

executing a machine-learned model trained to receive a driving scenario including a first object having a first trajectory and a second object having a second trajectory overlapping the first trajectory, wherein the machine-learned model is trained based on non-simulated driving scenario data.

6. A method comprising:

executing, by a driving simulation system comprising one or more processors, a driving simulation including a first simulated agent having a first trajectory in a simulated environment and a second simulated agent having a second trajectory in the simulated environment;

determining, by the driving simulation system, based at least in part on the first trajectory and the second trajectory, an interaction between the first simulated agent and the second simulated agent at an interaction point in the simulated environment;

executing, by the driving simulation system, a set of heuristics to determine the first simulated agent as being either a priority agent or a non-priority agent with respect to the second simulated agent, wherein the set of heuristics is based on at least one of:
- a future speed of the first simulated agent or the second simulated agent at the interaction point; or
- a route curvature of the first simulated agent or the second simulated agent between a current point and the interaction point;

determining, by the driving simulation system, an agent control parameter for the first simulated agent, based on the determination of the first simulated agent as the priority agent or the non-priority agent; and controlling, by the driving simulation system, the first simulated agent during the driving simulation using the agent control parameter.

7. The method of claim 6, further comprising:

determining, based at least in part on map data associated with the driving simulation:
- a first right-of-way state associated with the first simulated agent; and
- a second right-of-way state associated with the second simulated agent; and determining the first simulated agent as the priority agent, based at least in part on the first right-of-way state and the second right-of-way state.

8. The method of claim 7, wherein determining the first right-of-way state associated with the first simulated agent comprises at least one of:

determining that the first simulated agent is proceeding on a first road without a stop line;

determining that the first simulated agent is crossing a junction from a protected lane;

determining that the first simulated agent is crossing a junction from a priority lane;

determining that the first simulated agent is crossing a junction from a non-protected lane; or determining that the first simulated agent is crossing a junction from a non-protected and non-priority lane.

9. The method of claim 7, wherein determining the first right-of-way state associated with the first simulated agent comprises at least one of:

determining a classification of the first simulated agent; or determining that the first simulated agent performing a lane change on a first road.

10. The method of claim 7, further comprising:

based on determining that the first simulated agent and the second simulated agent are associated with a same right-of-way state, executing
- a machine-learned model trained to determine the priority agent.

11. The method of claim 6, further comprising determining the first simulated agent as the priority agent with respect to the second simulated agent, based at least in part on:

executing a machine-learned model trained to receive a driving scenario including a first object having a first trajectory and a second object having a second trajectory overlapping the first trajectory, wherein the machine-learned model is trained based on non-simulated driving scenario data.

12. The method of claim 6, further comprising:

using a first agent controller to control the first simulated agent during the driving simulation, based on the determination of the first simulated agent as the priority agent or the non-priority agent; and using a second agent controller to control the second simulated agent during the driving simulation, using a second agent control parameter based on the determination of the first simulated agent as the priority agent or the non-priority agent.

13. The method of claim 6, wherein controlling the first simulated agent comprises determining, based at least in part on the agent control parameter, at least one of:

a headway distance of the first simulated agent relative to the second simulated agent; or a lateral avoidance distance of the first simulated agent relative to the second simulated agent.

14. The method of claim 6, wherein determining the first simulated agent as being either the priority agent or the non-priority agent further comprises:

comparing a first predicted arrival time for the first simulated agent at the interaction point to a second predicted arrival time for the second simulated agent at the interaction point.

15. One or more non-transitory computer-readable media storing instructions executable by a processor, wherein the instructions, when executed, cause the processor to perform operations comprising:

executing, by a driving simulation system comprising one or more processors, a driving simulation including a first simulated agent having a first trajectory in a simulated environment and a second simulated agent having a second trajectory in the simulated environment;

determining, by the driving simulation system, based at least in part on the first trajectory and the second trajectory, an interaction between the first simulated agent and the second simulated agent at an interaction point in the simulated environment;

executing, by the driving simulation system, a set of heuristics to determine the first simulated agent as being either a priority agent or a non-priority agent with respect to the second simulated agent, wherein the set of heuristics is based on at least one of:
- a future speed of the first simulated agent or the second simulated agent at the interaction point; or
- a route curvature of the first simulated agent or the second simulated agent between a current point and the interaction point;

determining, by the driving simulation system, an agent control parameter for the first simulated agent, based on the determination of the first simulated agent as the priority agent or the non-priority agent; and controlling, by the driving simulation system, the first simulated agent during the driving simulation using the agent control parameter.

16. The one or more non-transitory computer-readable media of claim 15, the operations further comprising:

determining, based at least in part on map data associated with the driving simulation:
- a first right-of-way state associated with the first simulated agent; and
- a second right-of-way state associated with the second simulated agent; and determining the first simulated agent as the priority agent, based at least in part on the first right-of-way state and the second right-of-way state.

17. The one or more non-transitory computer-readable media of claim 16, wherein determining the first right-of-way state associated with the first simulated agent comprises at least one of:

determining that the first simulated agent is proceeding on a first road without a stop line;

determining that the first simulated agent is crossing a junction from a protected lane;

determining that the first simulated agent is crossing a junction from a priority lane;

determining that the first simulated agent is crossing a junction from a non-protected lane; or determining that the first simulated agent is crossing a junction from a non-protected and non-priority lane.

18. The one or more non-transitory computer-readable media of claim 16, wherein determining the first right-of-way state associated with the first simulated agent comprises at least one of:

determining a classification of the first simulated agent; or determining that the first simulated agent performing a lane change on a first road.

19. The one or more non-transitory computer-readable media of claim 15, the operations further comprising:

using a first agent controller to control the first simulated agent during the driving simulation, based on the determination of the first simulated agent as the priority agent or the non-priority agent; and using a second agent controller to control the second simulated agent during the driving simulation, using a second agent control parameter based on the determination of the first simulated agent as the priority agent or the non-priority agent.

20. The one or more non-transitory computer-readable media of claim 15, wherein controlling the first simulated agent comprises determining, based at least in part on the agent control parameter, at least one of:

a headway distance of the first simulated agent relative to the second simulated agent; or a lateral avoidance distance of the first simulated agent relative to the second simulated agent.

* * * * *